United States Patent
Zhang et al.

(10) Patent No.: US 10,622,009 B1
(45) Date of Patent: Apr. 14, 2020

(54) METHODS FOR DETECTING DOUBLE-TALK

(71) Applicant: Amazon Technologies, Inc., Seattle, WA (US)

(72) Inventors: Xianxian Zhang, Seattle, WA (US); Philip Ryan Hilmes, Seattle, WA (US); Trausti Thor Kristjansson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/126,471

(22) Filed: Sep. 10, 2018

(51) Int. Cl.
*G10L 25/78* (2013.01)
*G10L 21/0232* (2013.01)
*H04R 3/00* (2006.01)
*G06N 20/00* (2019.01)
*G10L 21/0208* (2013.01)

(52) U.S. Cl.
CPC .............. *G10L 25/78* (2013.01); *G06N 20/00* (2019.01); *G10L 21/0232* (2013.01); *H04R 3/00* (2013.01); *G10L 2021/02082* (2013.01); *G10L 2025/783* (2013.01); *H04R 2410/01* (2013.01)

(58) Field of Classification Search
CPC ................................................ H04R 2410/00
USPC ........................................................ 704/231
See application file for complete search history.

(56) References Cited

U.S. PATENT DOCUMENTS

| | | | |
|---|---|---|---|
| 10,115,411 B1* | 10/2018 | Chu ..................... | G10L 21/0224 |
| 10,299,061 B1* | 5/2019 | Sheen ..................... | H04S 7/301 |
| 2010/0030558 A1* | 2/2010 | Herbig .................. | G10L 15/222 |
| | | | 704/240 |
| 2014/0335917 A1* | 11/2014 | Tetelbaum ............ | H04M 9/082 |
| | | | 455/570 |
| 2019/0051299 A1* | 2/2019 | Ossowski ............... | G10L 15/08 |

* cited by examiner

*Primary Examiner* — Bharatkumar S Shah
(74) *Attorney, Agent, or Firm* — Pierce Atwood LLP

(57) ABSTRACT

A system configured to improve double-talk detection. The system detects when double-talk is present in a voice conversation using two or more speaker models. The system extracts feature data from microphone audio data and compares the feature data to each speaker model. For example, the system may generate a first distance score indicating a likelihood that the feature data corresponds to a far-end speaker model and a second distance score indicating a likelihood that the feature data corresponds to a universal speaker model. The system may determine current system conditions based on the distance scores and may change settings to improve speech quality during the voice conversation. For example, during far-end single-talk the system may aggressively reduce an echo signal, whereas during near-end single-talk and double-talk the system may apply minimal echo cancellation to improve a quality of the local speech.

19 Claims, 23 Drawing Sheets

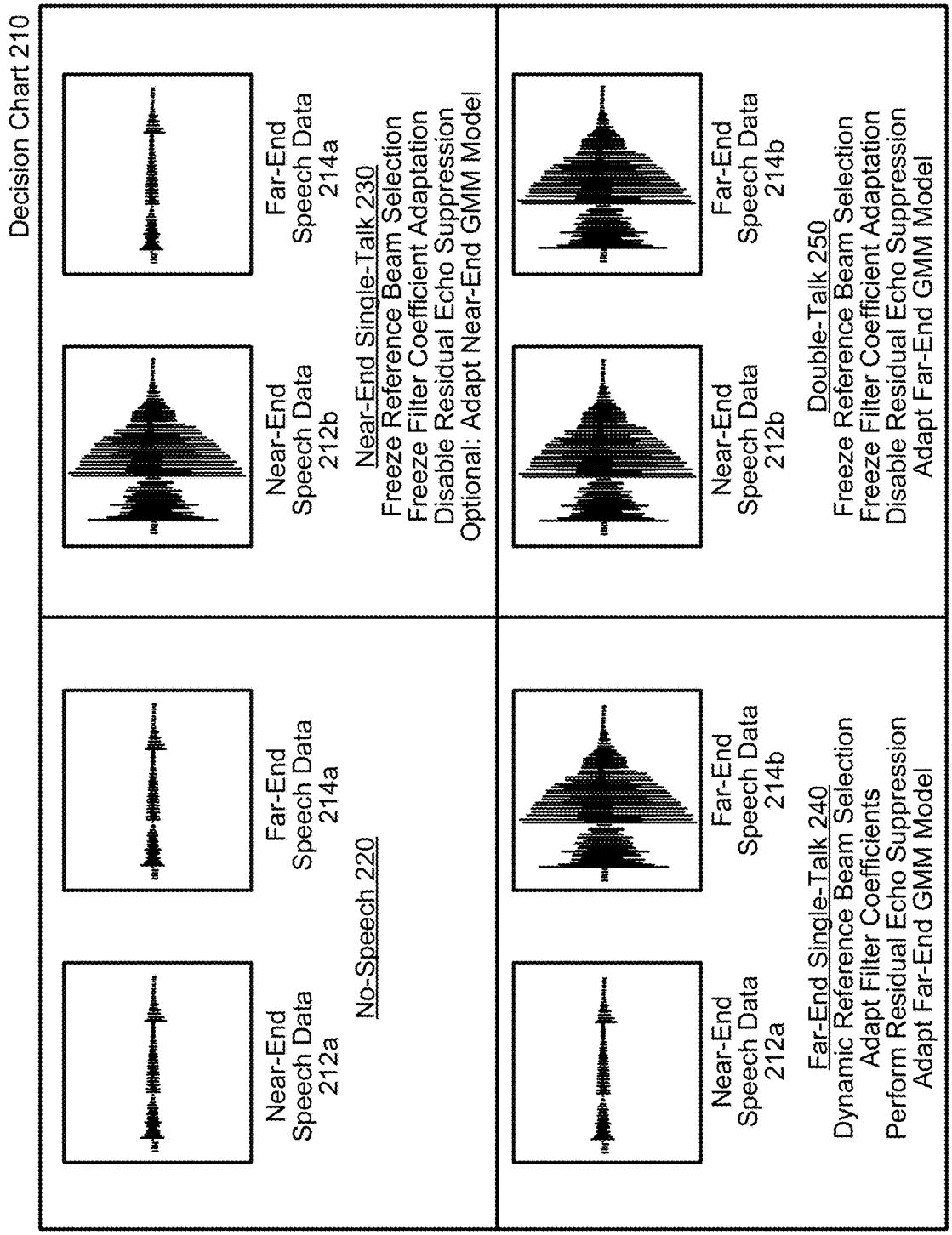

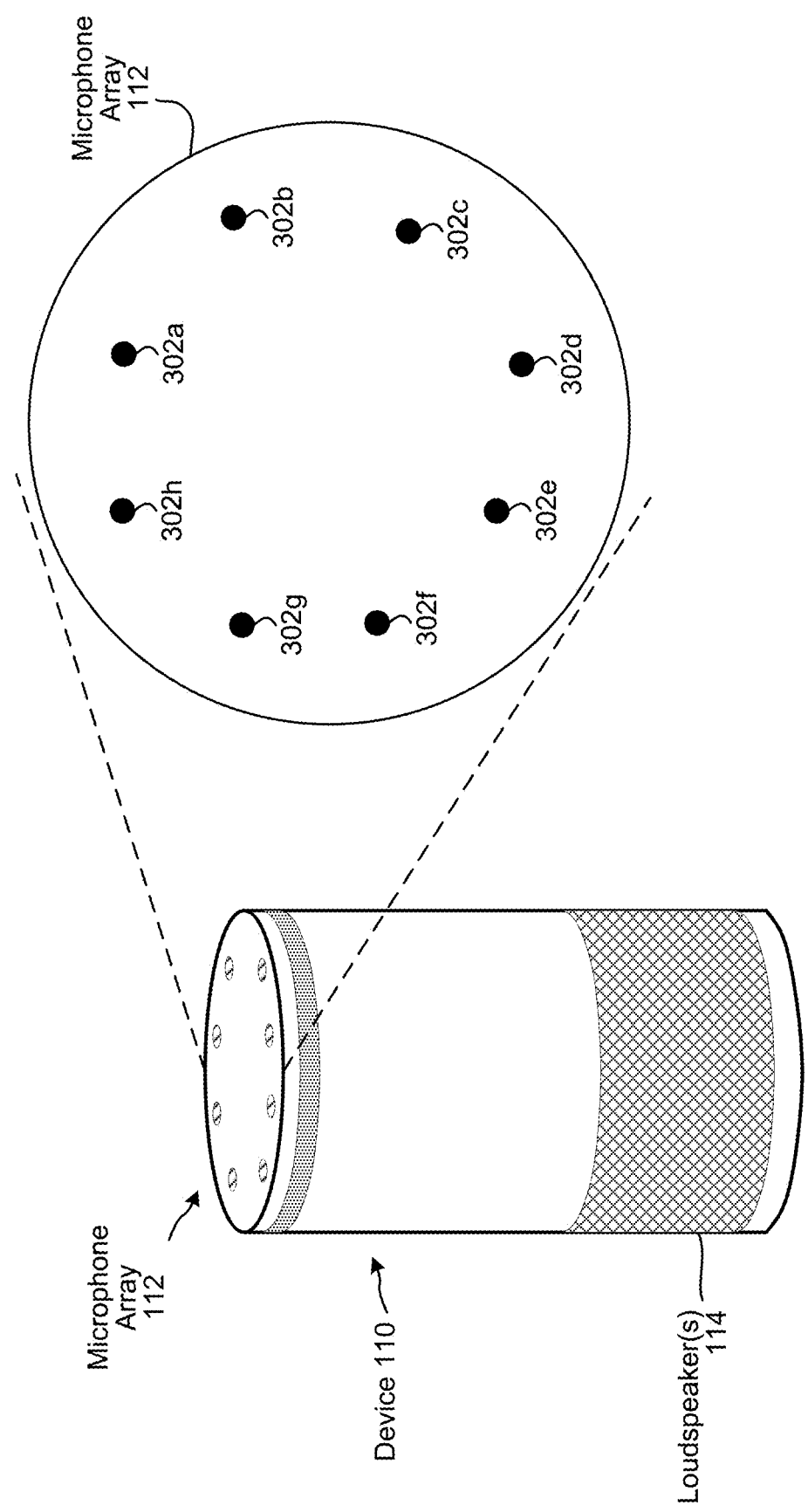

FIG. 5A Dynamic Reference Beam Selection During Far-End Single-Talk
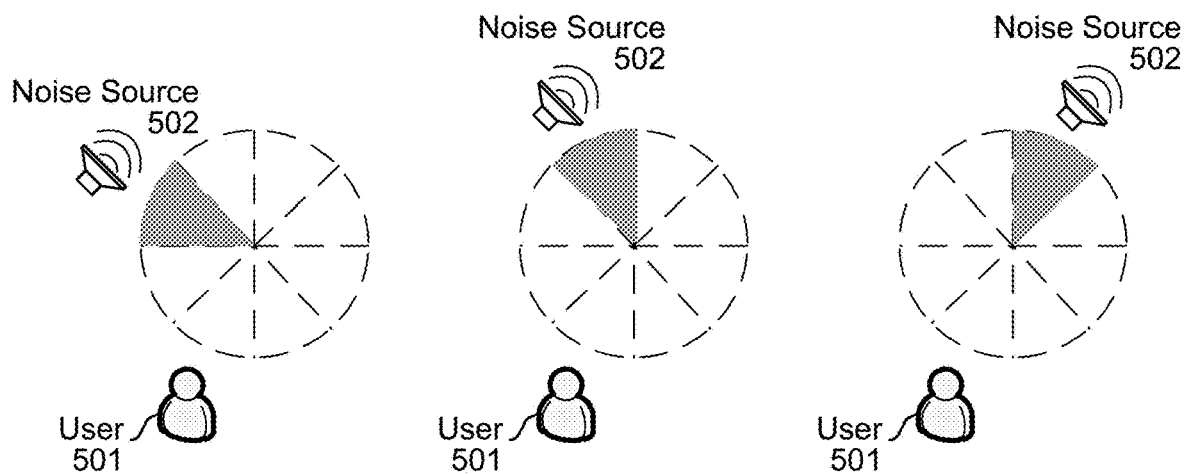
FIG. 5B Dynamic Reference Beam Selection During Near-End Single-Talk
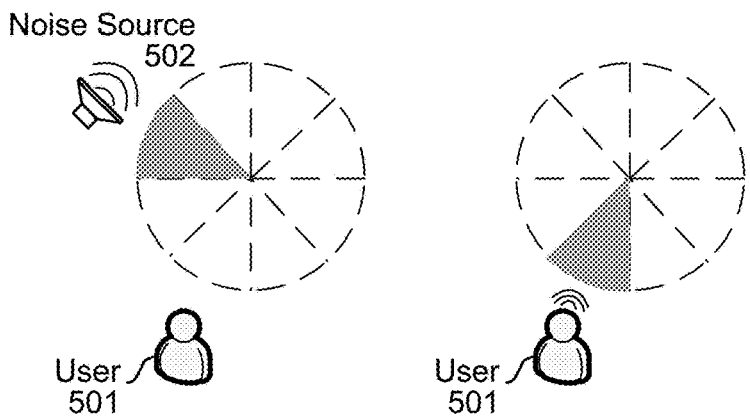
FIG. 5C Freezing Reference Beam Selection During Near-End Single-Talk
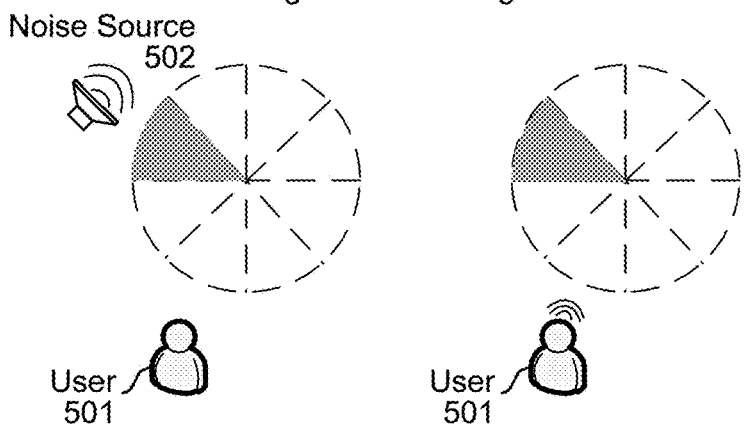

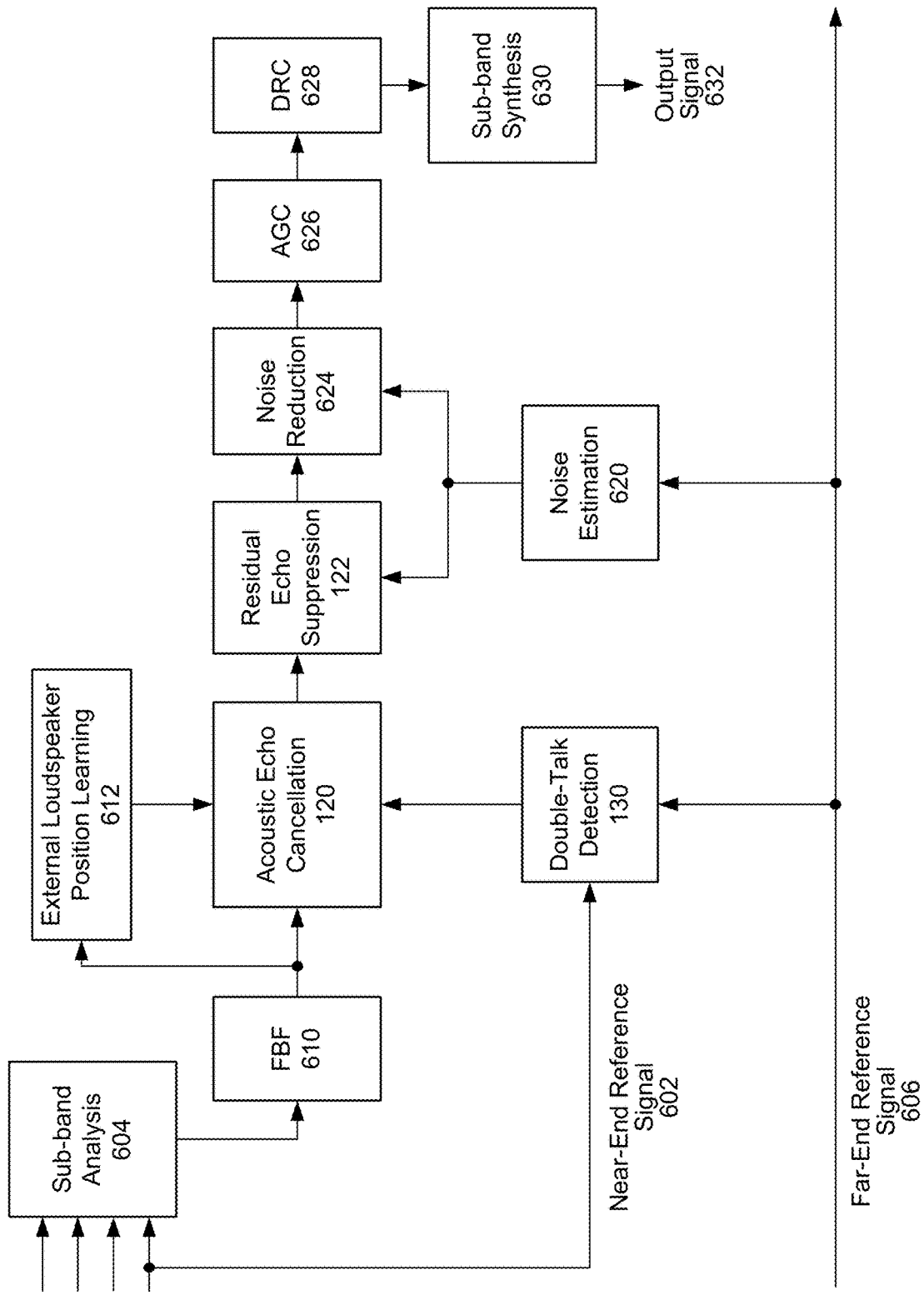

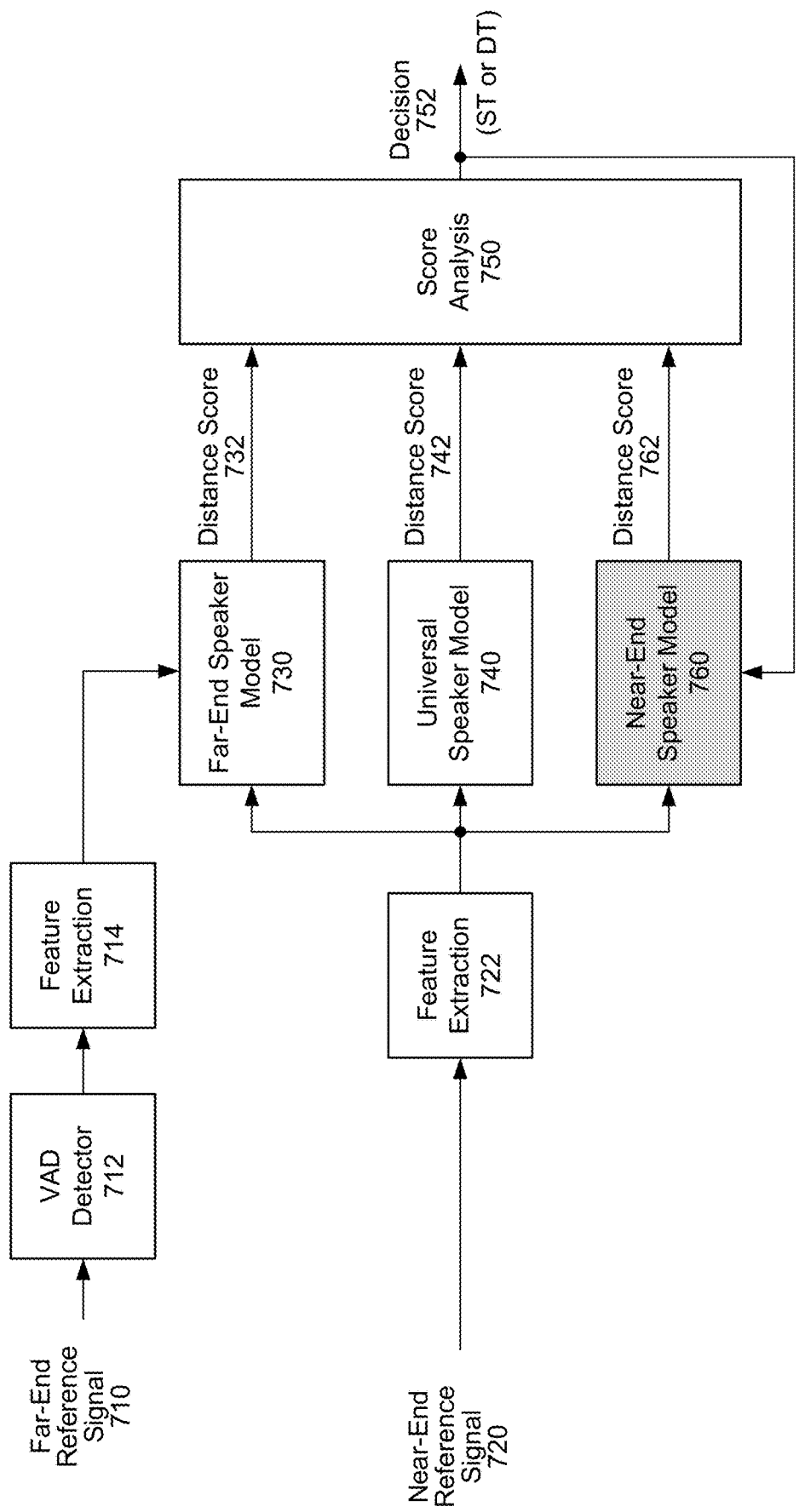

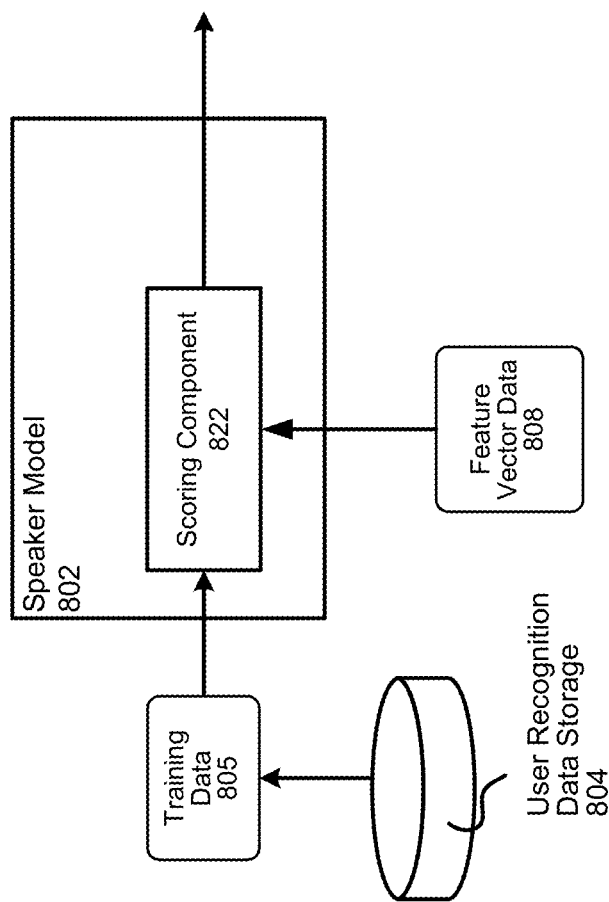

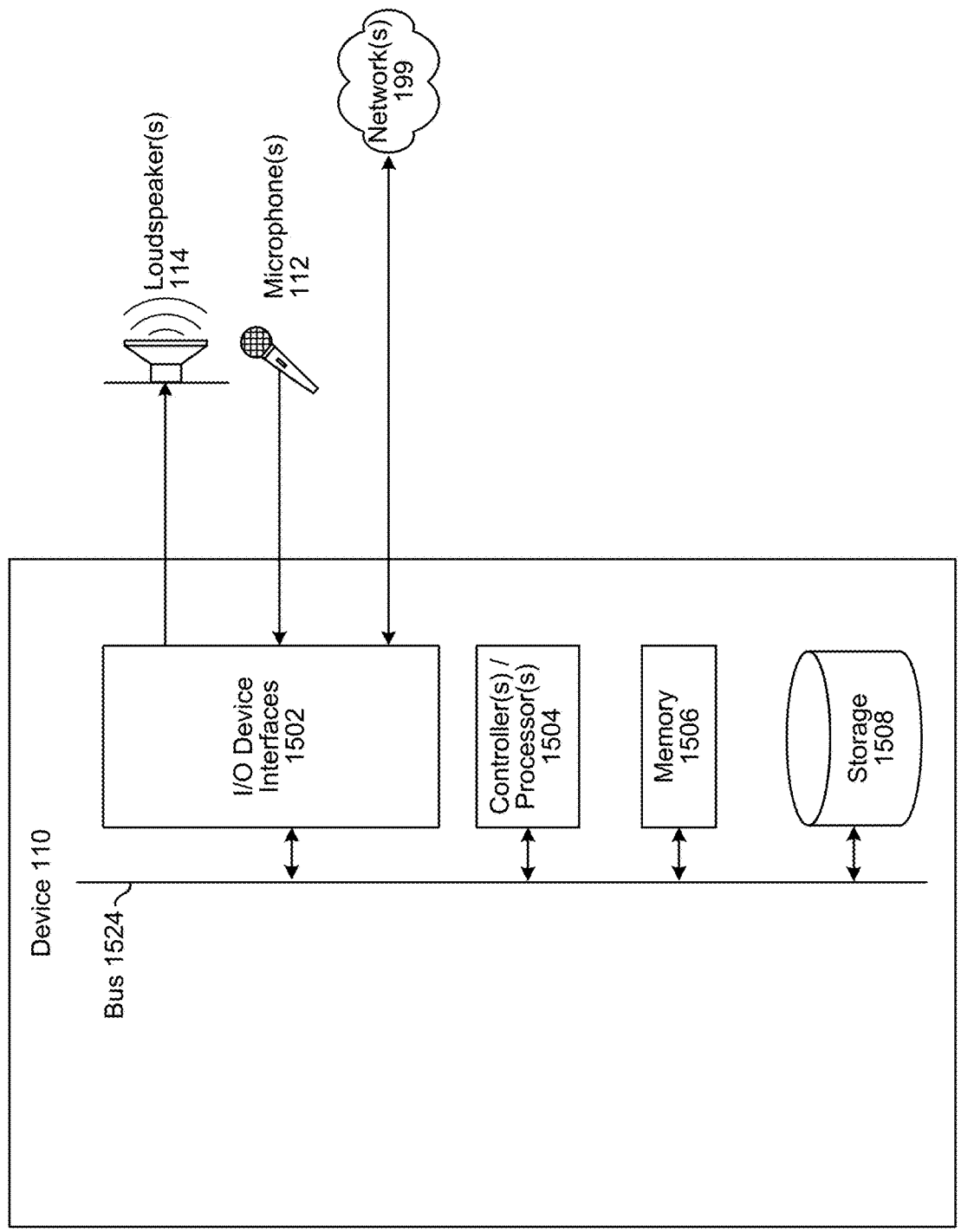

METHODS FOR DETECTING DOUBLE-TALK

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 2 illustrates an example decision chart for varying parameters based on system conditions according to examples of the present disclosure.

FIG. 3 illustrates a microphone array according to embodiments of the present disclosure.

FIGS. 5A-5C illustrate dynamic and fixed reference beam selection according to embodiments of the present disclosure.

FIG. 6 illustrates example components for processing audio data according to embodiments of the present disclosure.

FIGS. 7A-7B illustrate example components for performing double-talk detection using speaker models according to embodiments of the present disclosure.

FIG. 8 illustrates an example of a speaker model according to embodiments of the present disclosure.

FIG. 15 is a block diagram conceptually illustrating example components of a system according to embodiments of the present disclosure.

DETAILED DESCRIPTION

Figure 1:
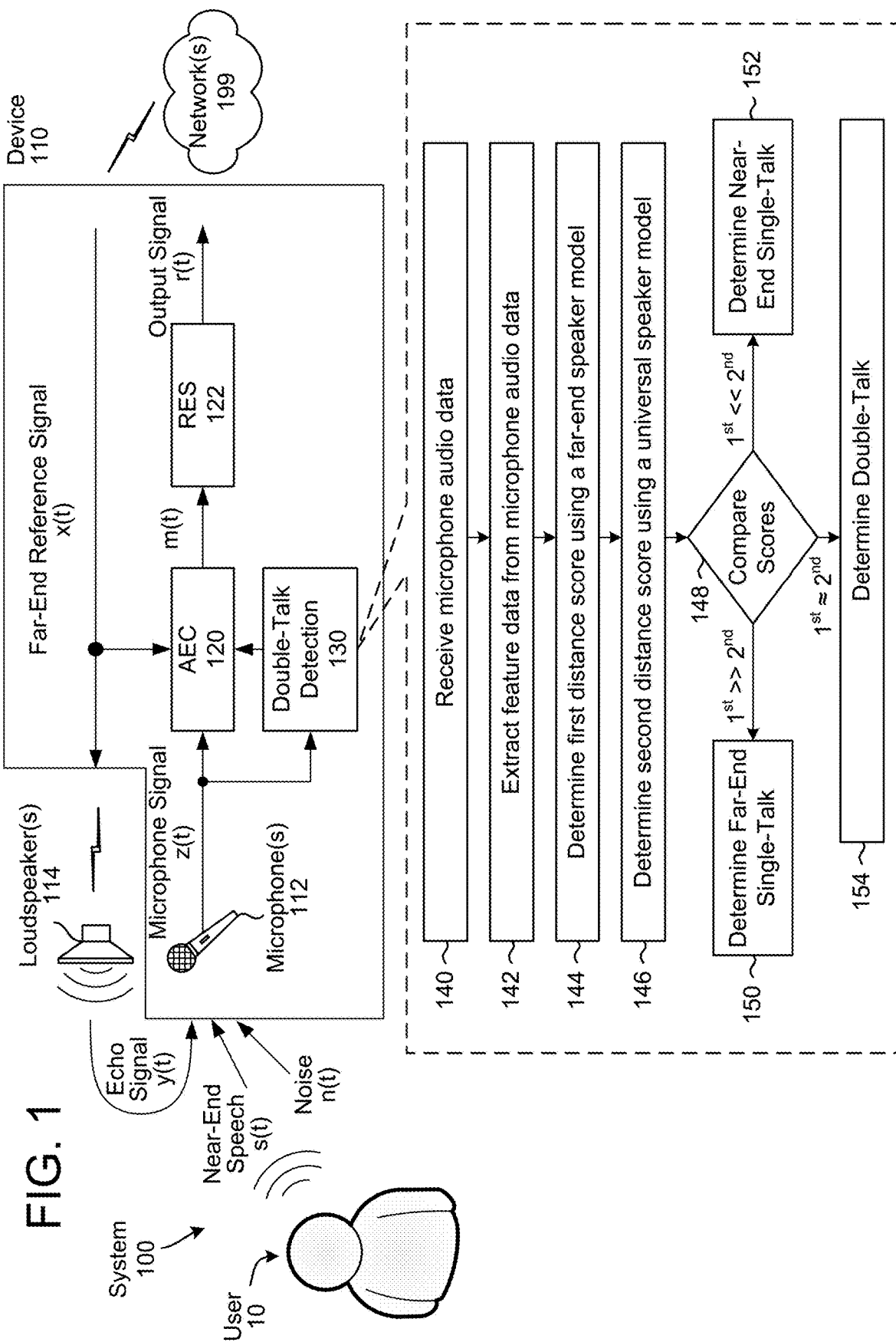
FIG. 1 illustrates a system according to embodiments of the present disclosure.

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation, residual echo suppression, and/or the like, to remove an "echo" signal corresponding to the playback audio data from the local audio data, isolating local speech to be used for voice commands and/or the communication session.

The device may apply different settings for audio processing based on current system conditions (e.g., whether local speech and/or remote speech is present in the local audio data). For example, when remote speech is present and local speech is not present in the local audio data (e.g., "far-end single-talk"), the device may use aggressive audio processing to suppress the unwanted additional signals included in the local audio data. When local speech is present and remote speech is not present in the local audio data (e.g., "near-end single-talk"), the device may use light audio processing to pass any speech included in the local audio data without distortion or degrading the speech. However, when remote speech and local speech are both present in the local audio data (e.g., "double-talk"), aggressive audio processing suppresses and/or distorts the local speech while light audio processing passes unwanted additional signals.

The device may determine the current system conditions using double-talk detection. Typically, conventional double-talk detection techniques calculate a cross-correlation between the local audio data and the playback audio data and determine whether near-end single-talk conditions, far-end single-talk conditions, or double-talk conditions are present based on the cross-correlation. While these conventional double-talk detection techniques may accurately detect current system conditions, calculating the cross-correlation results in latency or delays. More importantly, when using wireless loudspeaker(s) and/or when there are variable delays in outputting the playback audio data, performing the cross-correlation may require an extremely long analysis window (e.g., up to and exceeding 700 ms), as the echo latency is hard to predict and may vary. This long analysis window for finding the peak of the correlation requires not only a large memory but also increases a processing requirement (e.g., computation cost) for performing double-talk detection.

To improve double-talk detection, devices, systems and methods are disclosed that detect when double-talk is present in a voice conversation using speaker models. For example, the device may determine whether local speech and/or remote speech is present by comparing microphone audio data to two or more speaker models. A first speaker model may be specifically trained to detect remote speech (e.g., remote speech is used as training data), while a second speaker model may be trained to detect universal speech (e.g., speech from a plurality of users is used as training data). An optional third speaker model may be trained to detect local speech (e.g., local speech is used as training data), with the local speech being selected during near-end single-talk conditions. The device may extract feature data from the microphone audio data and compare the feature data to the speaker models to generate distance scores. For example, a first distance score indicates a likelihood that the feature data corresponds to the first speaker model, a second distance score indicates a likelihood that the feature data corresponds to the second speaker model, and a third distance score indicates a likelihood that the feature data corresponds to the third speaker model. Based on the distance scores, the device may determine whether near-end single-talk, far-end single-talk, or double-talk conditions are present.

FIG. 1 illustrates a high-level conceptual block diagram of a system 100 configured to perform double-talk detection. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure. To emphasize that the double-talk detection is beneficial when variable delays are present, FIG. 1 illustrates the one or more loudspeaker(s) 114 as being external to the device 110 and connected to the device 110 wirelessly. However, the disclosure is not limited thereto and the loudspeaker(s) 114 may be included in the device 110 and/or connected via a wired connection without departing from the disclosure.

The device 110 may be an electronic device configured to send audio data to and/or receive audio data. For example, the device 110 may receive playback audio data (e.g., far-end reference audio data) that includes remote speech and may generate output audio corresponding to the playback audio data using the one or more loudspeaker(s) 114. While generating the output audio, the device 110 may capture microphone audio data (e.g., input audio data) using the one or more microphone(s) 112. In addition to capturing desired speech (e.g., the microphone audio data includes a representation of local speech from a user 10), the device 110 may capture a portion of the output audio generated by the loudspeaker(s) 114 (including a portion of the remote speech), which may be referred to as an "echo" or echo signal, along with additional acoustic noise (e.g., undesired speech, ambient acoustic noise in an environment around the device 110, etc.), as discussed in greater detail below.

The system 100 may operate differently based on whether local speech (e.g., near-end speech) and/or remote speech (e.g., far-end speech) is present in the microphone audio data. For example, when the local speech is detected in the microphone audio data, the device 110 may apply first parameters to improve an audio quality associated with the local speech, without attenuating or degrading the local speech. In contrast, when the local speech is not detected in the microphone audio data, the device 110 may apply second parameters to attenuate the echo signal and/or noise.

As will be discussed in greater detail below, the device 110 may include a double-talk detection component 130 that determines current system conditions. For example, the double-talk detection component 130 may determine that neither local speech nor remote speech are detected in the microphone audio data, which corresponds to no-speech conditions. In some examples, the double-talk detection component 130 may determine that local speech is detected but remote speech is not detected in the microphone audio data, which corresponds to near-end single-talk conditions (e.g., local speech only). Alternatively, the double-talk detection component 130 may determine that remote speech is detected but local speech is not detected in the microphone audio data, which corresponds to far-end single-talk conditions (e.g., remote speech only). Finally, the double-talk detection component 130 may determine that both local speech and remote speech is detected in the microphone audio data, which corresponds to double-talk conditions (e.g., local speech and remote speech).

Typically, conventional double-talk detection components knows whether the remote speech is present based on whether the remote speech is present in the playback audio data. When the remote speech is present in the playback audio data, the echo signal is often represented in the microphone audio data after a consistent echo latency. Thus, the conventional double-talk detection components may estimate the echo latency by taking a cross-correlation between the playback audio data and the microphone audio data, with peaks in the cross-correlation data corresponding to portions of the microphone audio data that include the echo signal (e.g., remote speech). Therefore, the conventional double-talk detection components may determine that remote speech is detected in the microphone audio data and distinguish between far-end single-talk conditions and double-talk conditions by determining whether the local speech is also present. While the conventional double-talk detection components may determine that local speech is present using many techniques known to one of skill in the art, in some examples the conventional double-talk detection components may compare peak value(s) from the cross-correlation data to threshold values to determine current system conditions. For example, low peak values may indicate near-end single-talk conditions (e.g., no remote speech present due to low correlation between the playback audio data and the microphone audio data), high peak values may indicate far-end single-talk conditions (e.g., no local speech present due to high correlation between the playback audio data and the microphone audio data), and middle peak values may indicate double-talk conditions (e.g., both local speech and remote speech present, resulting in medium correlation between the playback audio data and the microphone audio data).

While the conventional double-talk detection components may accurately detect current system conditions, calculating the cross-correlation results in latency or delays. More importantly, when using wireless loudspeaker(s) 114 and/or when there are variable delays in outputting the playback audio data, performing the cross-correlation may require an extremely long analysis window (e.g., up to and exceeding 700 ms) to detect the echo latency, which is hard to predict and may vary. This long analysis window for finding the peak of the correlation requires not only a large memory but also increases a processing requirement (e.g., computation cost) for performing double-talk detection.

To perform double-talk detection, the double-talk detection component 130 may apply speaker verification techniques to determine whether local speech and/or remote speech is present. For ease of illustration, as used herein "speaker" refers to a person speaking, such as a local user or a remote user, whereas "loudspeaker" refers to a device that generates output audio based on audio data. Speaker verification is the process of verifying an identity of a speaker (e.g., user) based on a speech signal (e.g., utterance(s)) from the speaker. To perform double-talk detection using speaker verification techniques, the double-talk detection component 130 may include two or more speaker models and may compare the microphone audio data to each of the speaker models to generate a distance score, which indicates a likelihood that the microphone audio data corresponds to the corresponding speaker model (and thus the speech used to train the speaker model).

To illustrate a simple example, the double-talk detection component 130 may include two speaker models, a far-end (e.g., remote) speaker model adapted to the remote speech (e.g., trained using far-end speech) and a universal speaker model adapted to generic speech (e.g., trained using speech from a plurality of users). To detect current system conditions, the double-talk detection component 130 may compare the microphone audio data to the far-end speaker model to generate a first distance score indicating a likelihood that the microphone audio data corresponds to the far-end speaker model (e.g., the remote speech used to train the far-end speaker model). Similarly, the double-talk detection component 130 may compare the microphone audio data to the universal speaker model to generate a second distance score indicating a likelihood that the microphone audio data corresponds to the universal speaker model (e.g., generic or universal speech used to train the universal speaker model).

When the double-talk detection component 130 compares the microphone audio data to an individual speaker model, the double-talk detection component 130 generates an output indicating a likelihood that the microphone audio data corresponds to the respective speaker model. As used herein, this output is referred to as a "distance score" because the double-talk detection component 130 is actually comparing a similarity or "distance" between a feature vector extracted from the microphone audio data and a speaker model vector representing the speaker model. For example, the first distance score may correspond to an amount of similarity between the feature vector and a first vector associated with the far-end speaker model, whereas the second distance score may correspond to an amount of similarity between the feature vector and a second vector associated with the universal speaker model.

When the microphone audio data includes the remote speech and not the local speech (e.g., far-end single-talk conditions), the first distance score will be relatively high, indicating a high likelihood that the microphone audio data corresponds to the far-end speaker model (e.g., remote speech is present). When the microphone audio data doesn't include the remote speech (e.g., near-end single-talk conditions and/or no-speech conditions), the first distance score will be relatively low, indicating a low likelihood that the microphone audio data corresponds to the far-end speaker model (e.g., remote speech is not present). Thus, the double-talk detection component 130 may distinguish between near-end single-talk conditions and far-end single-talk conditions based on the first distance score.

Similarly, when the microphone audio data includes the remote speech and not the local speech (e.g., far-end single-talk conditions), the second distance score will be relatively low, indicating a low likelihood that the microphone audio data corresponds to the universal speaker model (e.g., local speech is present). When the microphone audio data includes the local speech and not the remote speech (e.g., near-end single-talk conditions), the second distance score will be relatively high, indicating a high likelihood that the microphone audio data corresponds to the universal speaker model (e.g., local speech is present).

When the microphone audio data includes both the local speech and the remote speech (e.g., double-talk conditions), the first distance score and the second distance score will satisfy individual condition(s) (e.g., be above lower threshold(s), below upper threshold(s), within a desired range, and/or the like), indicating a likelihood that the microphone audio data corresponds to both the far-end speaker model (e.g., remote speech is present) and the universal speaker model (e.g., local speech is present). In some examples, the double-talk detection component 130 may detect double-talk conditions by comparing the first distance score to first threshold(s) (e.g., above a first lower threshold value and/or below a first upper threshold value) and comparing the second distance score to second threshold(s) (e.g., above a second lower threshold value and/or below a second upper threshold value).

However, the disclosure is not limited thereto, and the double-talk detection component 130 may detect double-talk conditions using other techniques without departing from the disclosure, such as by comparing the first distance score to the second distance score. For example, the double-talk detection component 130 may determine that far-end single-talk conditions are present when the first distance score is much larger than the second distance score, may determine that near-end single-talk conditions are present when the second distance score is much larger than the first distance score, and may determine that double-talk conditions are present when a difference between the first distance score and the second distance score does not exceed a threshold value.

For ease of illustration, the disclosure may refer to comparing the distance score(s) to individual threshold(s). However, the disclosure is not limited thereto, and these threshold(s) correspond to the distance score(s) satisfying individual condition(s) (e.g., be above lower threshold(s), below upper threshold(s), within a desired range, and/or the like). Thus, examples referring to the device 110 determining that a distance score and/or difference between distance scores is above or below a threshold may also include the distance score and/or the difference between distance scores satisfying a condition without departing from the disclosure.

Using the speaker models, the double-talk detection component 130 may determine the current system conditions without regard to the variable delay associated with outputting the playback audio data. Additionally or alternatively, the double-talk detection component 130 may generate a third distance score based on a third speaker model (e.g., near-end speaker model), which may be adapted based on local speech detected during near-end single-talk conditions. As described in greater detail below, the double-talk detection component 130 may determine the distance scores by extracting feature data (e.g., feature vectors) from the microphone audio data, which was not described in the examples above.

As illustrated in FIG. 1, the device 110 may receive (140) microphone audio data and may extract (142) feature data from the microphone audio data, as described in greater detail below with regard to FIGS. 7A-7B and 9A-9C.

The device 110 may determine (144) a first distance score using a far-end speaker model and may determine (146) a second distance score using a universal speaker model. For example, the universal speaker model may correspond to a Universal Background Model (UBM), which is trained using generic speech from a plurality of users, whereas the far-end speaker model may correspond to a Gaussian Mixture Model (GMM) that is trained based on the remote speech. In some examples, the far-end speaker model may corresponds to a Gaussian Mixture Model-Universal Background Model (GMM-UBM), indicating that the far-end speaker model is initially trained using the generic speech from a plurality of users (e.g., same training audio data as the universal speaker model) and then specially adapted to detect the remote speech.

The device 110 may compare (148) the first distance score and the second distance score and determine (150) that far-end single-talk conditions are present, determine (152) that near-end single-talk conditions are present, or determine (154) that double-talk conditions are present. For example, the device 110 may determine that far-end single-talk conditions are present when the first distance score is much larger than the second distance score (e.g., $1^{st} \gg 2^{nd}$) may determine that near-end single-talk conditions are present when the second distance score is much larger than the first distance score (e.g., $1^{st} \ll 2^{nd}$), and may determine that double-talk conditions are present when a difference between the first distance score and the second distance score does not exceed a threshold value (e.g., $1^{st} \sim 2^{nd}$)) However, the disclosure is not limited thereto and the device 110 may determine the current system conditions using other techniques without departing from the disclosure. For example, the device 110 may compare the first distance score to first threshold(s) and compare the second distance score to second threshold(s), as discussed above.

While the above description provided a summary of how to perform double-talk detection using speaker models, the following paragraphs will describe FIG. 1 in greater detail.

For ease of illustration, some audio data may be referred to as a signal, such as a far-end reference signal x(t), an echo signal y(t), an echo estimate signal y'(t), a microphone signal z(t), error signal m(t) or the like. However, the signals may be comprised of audio data and may be referred to as audio data (e.g., far-end reference audio data x(t), echo audio data y(t), echo estimate audio data y'(t), microphone audio data z(t), error audio data m(t)) without departing from the disclosure.

During a communication session, the device 110 may receive a far-end reference signal x(t) (e.g., playback audio data) from a remote device/remote server(s) via the network(s) 199 and may generate output audio (e.g., playback audio) based on the far-end reference signal x(t) using the one or more loudspeaker(s) 114. Using one or more microphone(s) 112 in the microphone array, the device 110 may capture input audio as microphone signal z(t) (e.g., near-end reference audio data, input audio data, microphone audio data, etc.) and may send the microphone signal z(t) to the remote device/remote server(s) via the network(s) 199.

In some examples, the device 110 may send the microphone signal z(t) to the remote device as part of a Voice over Internet Protocol (VoIP) communication session. For example, the device 110 may send the microphone signal z(t) to the remote device either directly or via remote server(s) and may receive the far-end reference signal x(t) from the remote device either directly or via the remote server(s). However, the disclosure is not limited thereto and in some examples, the device 110 may send the microphone signal z(t) to the remote server(s) in order for the remote server(s) to determine a voice command. For example, during a communication session the device 110 may receive the far-end reference signal x(t) from the remote device and may generate the output audio based on the far-end reference signal x(t). However, the microphone signal z(t) may be separate from the communication session and may include a voice command directed to the remote server(s). Therefore, the device 110 may send the microphone signal z(t) to the remote server(s) and the remote server(s) may determine a voice command represented in the microphone signal z(t) and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

In audio systems, acoustic echo cancellation (AEC) processing refers to techniques that are used to recognize when the system 100 has recaptured sound via microphone(s) after some delay that the system 100 previously output via the loudspeaker(s) 114. The system 100 may perform AEC processing by subtracting a delayed version of the original audio signal (e.g., far-end reference signal x(t)) from the captured audio (e.g., microphone signal z(t)), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

Prior to sending the microphone signal z(t) to the remote device/remote server(s), the device 110 may perform acoustic echo cancellation (AEC), adaptive noise cancellation (ANC), residual echo suppression (RES), and/or other audio processing to isolate local speech captured by the microphone(s) 112 and/or to suppress unwanted audio data (e.g., echoes and/or noise). As illustrated in FIG. 1, the device 110 may receive the far-end reference signal x(t) (e.g., playback audio data) and may generate playback audio (e.g., echo signal y(t)) using the loudspeaker(s) 114. The far-end reference signal x(t) may be referred to as a far-end reference signal (e.g., far-end reference audio data), a playback signal (e.g., playback audio data) or the like. The one or more microphone(s) 112 in the microphone array may capture a microphone signal z(t) (e.g., microphone audio data, near-end reference signal, input audio data, etc.), which may include the echo signal y(t) along with near-end speech s(t) from the user 10 and noise n(t).

To isolate the local speech (e.g., near-end speech s(t) from the user 10), the device 110 may include an Acoustic Echo Canceller (AEC) component 120 that generates an echo estimate signal y'(t) based on the far-end reference signal x(t) and removes the echo estimate signal y'(t) from the microphone signal z(t). As the AEC component 120 does not have access to the echo signal y(t), the echo estimate signal y'(t) is an attempt to model the echo signal y(t) based on the far-end reference signal x(t). Thus, when the AEC component 120 removes the echo estimate signal y'(t) from the microphone signal z(t), the AEC component 120 is removing at least a portion of the echo signal y(t). Therefore, an output (e.g., error signal m(t)) of the AEC component 120 may include the near-end speech s(t), the noise n(t), and/or portions of the echo signal y(t) caused by differences between the echo estimate signal y'(t) and the actual echo signal y(t).

To improve the audio data, in some examples the device 110 may include a residual echo suppressor (RES) component 122 to dynamically suppress unwanted audio data (e.g., the noise n(t) and the portions of the echo signal y(t) that were not removed by the AEC component 120). For example, when the far-end reference signal x(t) is active and the near-end speech s(t) is not present in the error signal m(t), the RES component 122 may attenuate the error signal m(t) to generate final output audio data r(t). This removes and/or reduces the unwanted audio data from the final output audio data r(t). However, when near-end speech s(t) is present in the error signal m(t), the RES component 122 may act as a pass-through filter and pass the error signal m(t) without attenuation. This avoids attenuating the near-end speech s(t).

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Far-end reference audio data (e.g., far-end reference signal x(t)) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the far-end reference audio data may be referred to as playback audio data, loudspeaker audio data, and/or the like without departing from the disclosure. For ease of illustration, the following description will refer to the playback audio data as far-end reference audio data. As noted above, the far-end reference audio data may be referred to as far-end reference signal(s) x(t) without departing from the disclosure.

Microphone audio data corresponds to audio data that is captured by the microphone(s) 114 prior to the device 110 performing audio processing such as AEC processing. The microphone audio data may include local speech s(t) (e.g., an utterance, such as near-end speech generated by the user 10), an "echo" signal y(t) (e.g., portion of the playback audio captured by the microphone(s) 114), acoustic noise n(t) (e.g., ambient noise in an environment around the device 110), and/or the like. As the microphone audio data is captured by the microphone(s) 114 and captures audio input to the device 110, the microphone audio data may be referred to as input audio data, near-end audio data, and/or the like without departing from the disclosure. For ease of illustration, the following description will refer to microphone audio data and near-end reference audio data interchangeably. As noted above, the near-end reference audio data/microphone audio data may be referred to as a near-end reference signal or microphone signal z(t) without departing from the disclosure.

An "echo" signal y(t) corresponds to a portion of the playback audio that reaches the microphone(s) 114 (e.g., portion of audible sound(s) output by the loudspeaker(s) 114 that is recaptured by the microphone(s) 112) and may be referred to as an echo or echo data y(t). The echo signal y(t) can be characterized based on a transfer function. For example, a first portion of the playback audio data output by the loudspeaker(s) 114 and captured by a first microphone 112a can be characterized (e.g., modeled) using a first transfer function $h_{a1}(n)$ and a second portion of the playback audio data output by the loudspeaker(s) 114 and captured by a second microphone 112b can be characterized using a second transfer function $h_{a2}(n)$. Thus, a number of transfer functions may vary depending on the number of loudspeaker(s) 114 and/or microphone(s) 112 without departing from the disclosure. The transfer functions h(n) vary with the relative positions of the components and the acoustics of the room (e.g., environment surrounding the device 110). If the position of all of the objects in the room are static, the transfer functions h(n) are likewise static. Conversely, if the position of an object in the room changes, the transfer functions h(n) may change.

To isolate the local speech s(t) included in the microphone audio data z(t), the device 110 may perform acoustic echo cancellation (AEC) processing or the like to "remove" the echo signal y(t) from the microphone audio data z(t) and generate output audio data. As the device 110 does not know the exact echo signal y(t) included in the microphone audio data z(t), the device 110 may generate an echo estimate signal y'(t) (e.g., estimate of the echo signal) using the playback audio data and transfer function(s) h(n) and may "remove" the echo estimate signal y'(t) by subtracting the echo estimate signal y'(t) from the microphone audio data z(t). For example, the device 110 may generate a first echo estimate signal $y_1'(t)$ based on the playback audio data and the first transfer function $h_{a1}(n)$ and may generate a second echo estimate signal $y_2'(t)$ based on the playback audio data and the second transfer function $h_{a2}(n)$. Thus, reference to removing the echo signal y(t) to generate the output audio data implies that the device 110 generates the echo estimate signal y'(t) and subtracts the echo estimate signal y'(t) from the microphone audio data z(t) in order to generate the output audio data. As noted above, the echo estimate signal may be referred to as echo estimate audio data y'(t) without departing from the disclosure.

Output audio data corresponds to audio data after the device 110 performs audio processing (e.g., AEC processing, ANC processing, and/or the like) to isolate the local speech s(t). For example, the output audio data corresponds to the microphone audio data z(t) after subtracting the echo estimate signal y'(t), optionally removing and/or reducing the acoustic noise n(t) (e.g., using adaptive noise cancellation (ANC), acoustic interference cancellation (AIC), and/or the like), optionally performing residual echo suppression (RES), and/or other audio processing known to one of skill in the art. While the audio processing removes at least a portion of the echo estimate signal y'(t) and/or the acoustic noise n(t), the output audio data may still include a portion of the echo estimate signal y'(t) and/or the acoustic noise n(t) in addition to the local speech s(t). As noted above, the output audio data may be referred to as output audio signal(s) without departing from the disclosure, and one of skill in the art will recognize that the output audio data may also be referred to as an error audio data m(t), error signal m(t) and/or the like.

For ease of illustration, the following description may refer to generating the output audio data by performing AEC processing and RES processing. However, the disclosure is not limited thereto, and the device 110 may generate the output audio data by performing AEC processing, RES processing, other audio processing, and/or a combination thereof. Additionally or alternatively, the disclosure is not limited to AEC processing and, in addition to or instead of performing AEC processing, the device 110 may perform other processing to remove or reduce unwanted speech $s_2(t)$ (e.g., speech associated with a second user), unwanted acoustic noise n(t), and/or estimate echo signals y'(t), such as adaptive noise cancellation (ANC) processing, acoustic interference cancellation (AIC) processing, and/or the like without departing from the disclosure.

Residual echo suppression is performed by selectively attenuating, based on individual frequency bands, first audio data output by the AEC component 120 to generate second audio data output by the RES component. For example, performing RES processing may determine a gain for a portion of the first audio data corresponding to a specific frequency band (e.g., 100 Hz to 200 Hz) and may attenuate the portion of the first audio data based on the gain to generate a portion of the second audio data corresponding to the specific frequency band. Thus, a gain may be determined for each frequency band and therefore the amount of attenuation may vary based on the frequency band.

The device 110 may determine the gain based on the attenuation value. For example, a low attenuation value $\alpha_1$ (e.g., closer to a value of zero) results in a gain that is closer to a value of one and therefore an amount of attenuation is relatively low. Thus, the RES component 122 acts similar to a pass-through filter for the low frequency bands. An energy level of the second audio data is therefore similar to an energy level of the first audio data. In contrast, a high attenuation value as (e.g., closer to a value of one) results in a gain that is closer to a value of zero and therefore an amount of attenuation is relatively high. Thus, the RES component 122 attenuates the high frequency bands, such that an energy level of the second audio data is lower than an energy level of the first audio data. Therefore, the energy level of the second audio data corresponding to the high frequency bands is lower than the energy level of the second audio data corresponding to the low frequency bands.

In some examples, during near-end single-talk conditions (e.g., when the far-end speech is not present), the RES component 122 may act as a pass through filter and pass the error signal m(t) without attenuation. That includes when the near-end speech is not present, which is referred to as "no-talk" or no-speech conditions, and when the near-end speech is present, which is referred to as "near-end single-talk." Thus, the RES component 122 may determine a gain with which to attenuate the error signal m(t) using a first attenuation value ($\alpha_1$) for both low frequencies and high frequencies. In contrast, when the far-end speech is present and the near-end speech is not present, which is referred to as "far-end single-talk," the RES component 122 may act as an attenuator and may attenuate the error signal m(t) based on a gain calculated using a second attenuation value ($\alpha_2$) for low frequencies and high frequencies. For ease of illustration, the first attenuation value $\alpha_1$ may be referred to as a "low attenuation value" and may be smaller (e.g., closer to a value of zero) than the second attenuation value $\alpha_2$. Similarly, the second attenuation value as may be referred to as a "high attenuation value" and may be larger (e.g., closer to a value of one) than the first attenuation value $\alpha_1$. However, the disclosure is not limited thereto and in some examples the first attenuation value $\alpha_1$ may be higher than the second attenuation value as without departing from the disclosure.

When the near-end speech is present and the far-end speech is present, "double-talk" occurs. During double-talk conditions, the RES component 122 may pass low frequencies of the error signal m(t) while attenuating high frequencies of the error signal m(t). For example, the RES component 122 may determine a gain with which to attenuate the error signal m(t) using the low attenuation value ($\alpha_1$) for low frequencies and the high attenuation value ($\alpha_2$) for high frequencies.

FIG. 2 illustrates an example decision chart for varying parameters based on system conditions according to examples of the present disclosure. As illustrated in decision chart 210, the device 110 may distinguish between different system conditions. For example, the device 110 may determine whether no-speech conditions 220 are present (e.g., no near-end speech and no far-end speech, represented by near-end speech data 212a and far-end speech data 214a), near-end single-talk conditions 230 are present (e.g., near-end speech but no far-end speech, represented by near-end speech data 212b and far-end speech data 214a), far-end single-talk conditions 240 are present (e.g., far-end speech but no near-end speech, represented by near-end speech data 212a and far-end speech data 214b), or double-talk conditions 250 are present (e.g., near-end speech and far-end speech, represented by near-end speech data 212b and far-end speech data 214b).

For ease of illustration, FIG. 2 illustrates examples of the near-end speech being absent (e.g., near-end speech data 212a) or present (e.g., near-end speech data 212b). However, the device 110 does not receive an isolated near-end speech signal that only represents the near-end speech. Instead, the device 110 receives the microphone audio data, which includes the near-end speech data, along with a representation of portions of the far-end speech data that is recaptured as an echo signal by the microphone(s) 112, environment noise, and/or other audio data that does not correspond to the near-end speech.

The device 110 may select parameters based on whether near-end speech is detected. For example, when far-end speech is detected and near-end speech is not detected (e.g., during far-end single-talk conditions 240), the device 110 may select parameters to reduce and/or suppress echo signals represented in the output audio data. As illustrated in FIG. 2, this may include performing dynamic reference beam selection, adapting filter coefficients for an adaptive noise canceller, and performing RES processing. In contrast, when near-end speech is detected (e.g., during near-end single-talk conditions 230 and/or double-talk conditions 250), the device 110 may select parameters to improve a quality of the speech in the output audio data (e.g., avoid cancelling and/or suppressing the near-end speech). As illustrated in FIG. 2, this may include freezing reference beam selection, freezing filter coefficient adaptation for the adaptive noise canceller, and disabling RES processing.

Dynamic reference beam selection, which will be described in greater detail below with regard to FIGS. 5A-5C, refers to adaptively selecting a reference beam based on which beamformed audio data has a highest energy. For example, the device 110 may dynamically select the reference beam based on which beamformed audio data has the largest amplitude and/or highest power, thus selecting the loudest beam as a reference beam to be removed during noise cancellation. During far-end single-talk conditions, this works well as the loudspeaker(s) 114 generating output audio based on the far-end reference signal are louder than other sources of noise and therefore the ARA processing selects the beamformed audio data associated with the loudspeaker(s) 114 as a reference signal. Thus, the adaptive noise cancellation (ANC) component removes the acoustic noise and corresponding echo from the output audio data. However, during near-end single-talk conditions and/or double-talk conditions, the near-end speech may be louder than the loudspeaker(s) 114 and therefore the ARA processing selects the beamformed audio data associated with the near-end speech as a reference signal. Thus, instead of removing noise and/or echo and isolating the local speech, the ANC component removes portions of the local speech.

Similarly, the device 110 may adapt filter coefficients associated with the ANC component during far-end single-talk conditions but may freeze filter coefficient adaptation during near-end single-talk conditions and double-talk conditions. For example, in order to remove an echo associated with the far-end reference signal, the device 110 adapts the filter coefficients during far-end single-talk conditions to minimize an "error signal" (e.g., output of the ANC component). However, the error signal should not be minimized during near-end single-talk conditions and/or double-talk conditions as the output of the ANC component includes the local speech. Therefore, because continuing to adapt the filter coefficients during near-end single-talk conditions and/or double-talk conditions would result in the ANC component removing portions of the local speech from the output audio data, the device 110 freezes filter coefficient adaptation.

Finally, residual echo suppression (RES) processing further attenuates or suppresses audio data output by the ANC component. During far-end single-talk conditions, this audio data only includes noise and/or far-end speech, and therefore performing RES processing improves the audio data output by the device 110 during a communication session. However, during near-end single-talk conditions and/or double-talk conditions, this audio data may include local speech, and therefore performing RES processing attenuates at least portions of the local speech and degrades the audio data output by the device 110 during the communication session. Therefore, the device 110 may enable RES processing and/or apply aggressive RES processing during far-end single-talk conditions (e.g., to suppress unwanted noise and echo), but may disable RES and/or apply slight RES during near-end single-talk conditions and double-talk conditions (e.g., to improve a quality of the local speech).

As will be discussed in greater detail below with regard to FIG. 9B, the device 110 may adapt a far-end speaker model based on far-end speech represented in a far-end reference signal. As the far-end reference signal is isolated from the near-end speech, the device 110 may adapt the far-end speaker model during both far-end single-talk conditions and double-talk conditions.

Similarly, as will be discussed in greater detail below with regard to FIG. 9C, the device 110 may optionally adapt a near-end speaker model based on near-end speech represented in the near-end reference signal. However, as the near-end reference signal may include both the near-end speech and the far-end speech, the device 110 may only adapt the near-end speaker model during near-end single-talk conditions.

As illustrated in FIG. 2, the device 110 does not set specific parameters during no speech conditions 220. As there is no far-end speech or near-end speech, output audio data output by the device 110 should be relatively low in energy. In addition, either performing adaptive noise cancellation processing and/or residual echo suppression processing may further suppress unwanted noise from the output audio data. Thus, first parameters associated with near-end single-talk conditions 230, second parameters associated with far-end single-talk conditions 240, and/or third parameters associated with double-talk conditions 250 may be applied during no speech conditions 220 without departing from the disclosure. As the device 110 may easily determine that the echo signal and therefore far-end speech is faint during no-speech conditions 220, the device 110 typically applies the first parameters associated with near-end single-talk conditions 230, although the disclosure is not limited thereto.

Figure 4A:
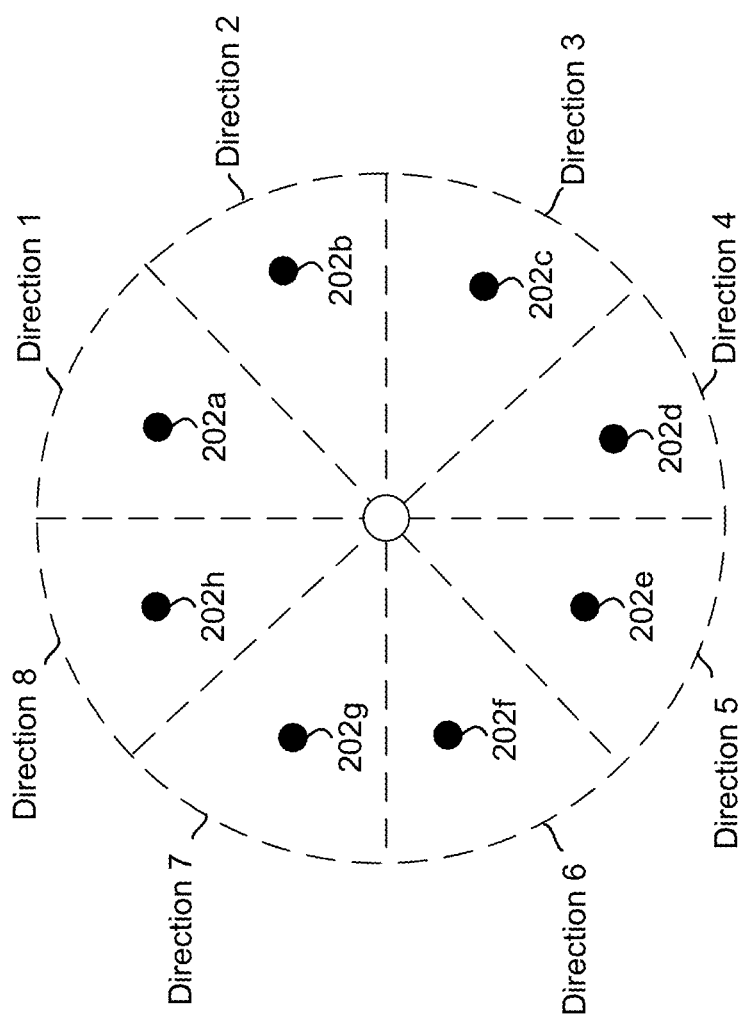
FIG. 4A illustrates associating directions with microphones of a microphone array according to embodiments of the present disclosure.
Figure 4B:
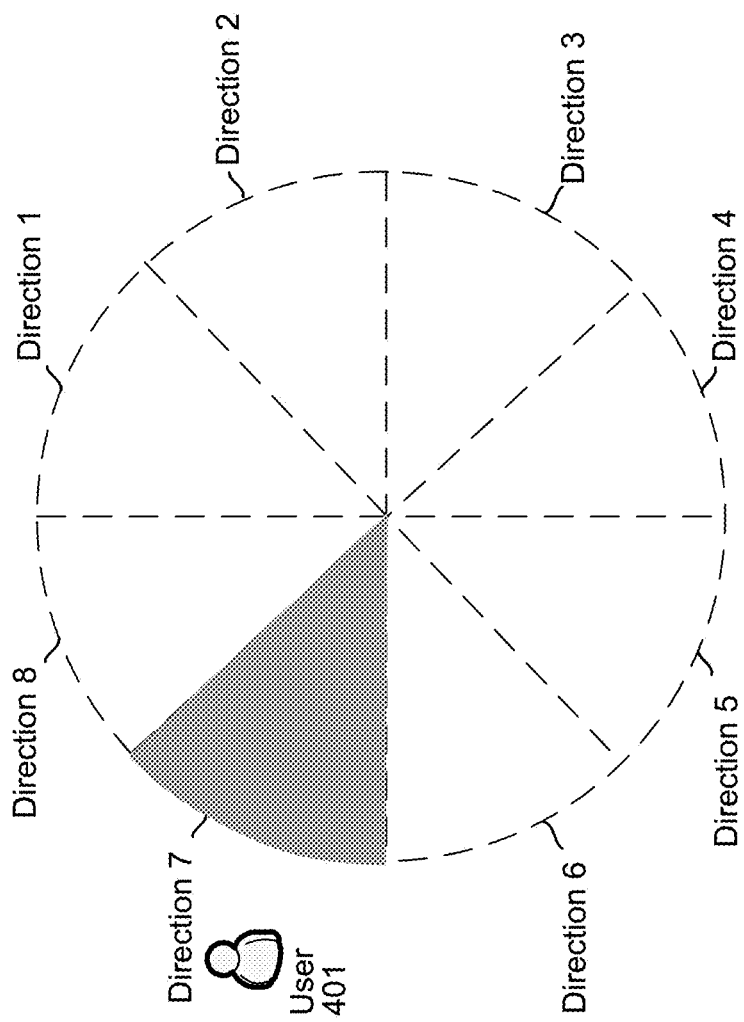
FIGS. 4B and 4C illustrate isolating audio from a direction to focus on a desired audio source according to embodiments of the present disclosure.
Figure 4C:
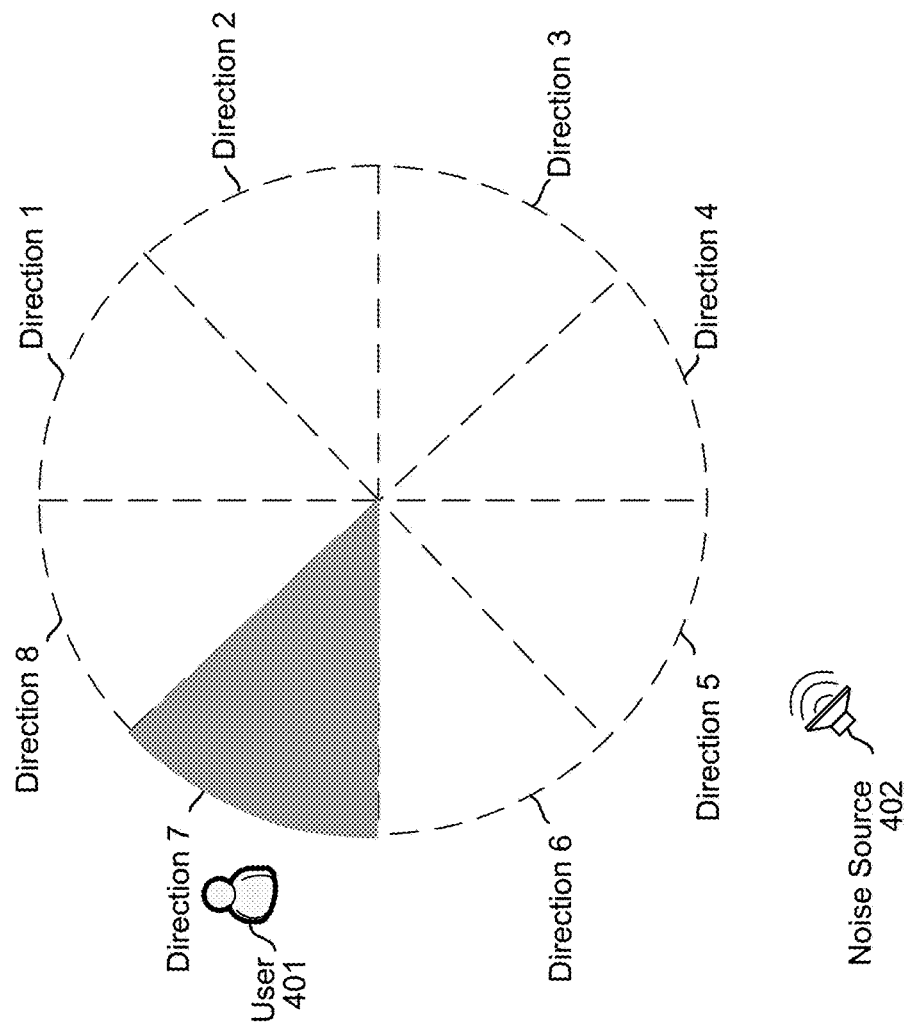

Further details of the device operation are described below following a discussion of directionality in reference to FIGS. 3-4C.

As illustrated in FIG. 3, a device 110 may include, among other components, a microphone array including a plurality of microphone(s) 112, one or more loudspeaker(s) 114, a beamformer unit (as discussed below), or other components. The microphone array may include a number of different individual microphones. In the example configuration of FIG. 3, the microphone array includes eight (8) microphones, 302a-302h. The individual microphones may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. As shown in FIG. 4A, a particular direction may be associated with a particular microphone 302 of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 302a, direction 2 is associated with microphone 302b, and so on. Alternatively, particular directions and/or beams may not necessarily be associated with a specific microphone without departing from the present disclosure. For example, the device 110 may include any number of microphones and/or may isolate any number of directions without departing from the disclosure.

To isolate audio from a particular direction the device may apply a variety of audio filters to the output of the microphones where certain audio is boosted while other audio is dampened, to create isolated audio data corresponding to a particular direction, which may be referred to as a beam. While in some examples the number of beams may correspond to the number of microphones, the disclosure is not limited thereto and the number of beams may vary from the number of microphones without departing from the disclosure. For example, a two-microphone array may be processed to obtain more than two beams, using filters and beamforming techniques to isolate audio from more than two directions. Thus, the number of microphones may be more than, less than, or the same as the number of beams. The beamformer unit of the device may have a fixed beamformer (FBF) unit and/or an adaptive beamformer (ABF) unit processing pipeline for each beam, as explained below.

The device 110 may use various techniques to determine the beam corresponding to the look-direction. For example, if audio is first detected by a particular microphone, the device 110 may determine that the source of the audio is associated with the direction of the microphone in the array. Other techniques may include determining which microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

To illustrate an example, if audio data corresponding to a user's speech is first detected and/or is most strongly detected by microphone 302g, the device 110 may determine that a user 401 is located at a location in direction 7. Using a FBF unit or other such component, the device 110 may isolate audio data coming from direction 7 using techniques known to the art and/or explained herein. Thus, as shown in FIG. 4B, the device 110 may boost audio data coming from direction 7, thus increasing the amplitude of audio data corresponding to speech from the user 401 relative to other audio data captured from other directions. In this manner, noise from diffuse sources that is coming from all the other directions will be dampened relative to the desired audio (e.g., speech from user 401) coming from direction 7.

One drawback to the FBF unit approach is that it may not function as well in dampening/canceling noise from a noise source that is not diffuse, but rather coherent and focused from a particular direction. For example, as shown in FIG. 4C, a noise source 402 may be coming from direction 5 but may be sufficiently loud that noise canceling/beamforming techniques using an FBF unit alone may not be sufficient to remove all the undesired audio coming from the noise source 402, thus resulting in an ultimate output audio signal determined by the device 110 that includes some representation of the desired audio resulting from user 401 but also some representation of the undesired audio resulting from noise source 402.

Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech.

As an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform AEC by removing (e.g., subtracting) the reference signal from the target signal. As the input audio data is not limited to the echo signal, the ARA processing may remove other acoustic noise represented in the input audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure.

To improve noise cancellation, the ANC component may amplify audio signals from two or more directions other than the look direction (e.g., target signal). These audio signals represent noise signals so the resulting amplified audio signals may be referred to as noise reference signals. The device 110 may then weight the noise reference signals, for example using filters, and combine the weighted noise reference signals into a combined (weighted) noise reference signal. Alternatively the device 110 may not weight the noise reference signals and may simply combine them into the combined noise reference signal without weighting. The device 110 may then subtract the combined noise reference signal from the target signal to obtain a difference (e.g., noise-cancelled audio data). The device 110 may then output that difference, which represents the desired output audio signal with the noise removed. The diffuse noise is removed by the FBF unit when determining the target signal and the directional noise is removed when the combined noise reference signal is subtracted.

As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones 112 (e.g., first audio data associated with a first microphone 112a, second audio data associated with a second microphone 112b, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, beamforming is done by determining filter coefficient values (e.g., Finite Impulse Response (FIR) filter coefficient values) for each beam direction (e.g., look direction, direction of interest, etc.) based on a position of physical microphones in the microphone array 114. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

Therefore, the device 110 may perform a first directional calculation by applying first filter coefficient values to the input audio signals to generate the first beamformed audio data and may perform a second directional calculation by applying second filter coefficient values to the input audio signals to generate the second beamformed audio data. The filter coefficient values used to perform the beamforming operation may be calculated offline (e.g., preconfigured ahead of time) and stored in the device 110. For example, the device 110 may store filter coefficient values associated with hundreds of different directional calculations (e.g., hundreds of specific directions) and may select the desired filter coefficient values for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficient values) being referred to as a "first beam" corresponding to the first direction, the second directional calculation (e.g., second filter coefficient values) being referred to as a "second beam" corresponding to the second direction, and so on. Thus, the device 110 stores hundreds of "beams" (e.g., directional calculations and associated filter coefficient values) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficient values used to generate the first beam.

After beamforming, the device 110 may optionally perform adaptive interference cancellation using the ARA processing on the beamformed audio data. For example, after generating the plurality of audio signals (e.g., beamformed audio data) as described above, the device 110 may determine one or more target signal(s), determine one or more reference signal(s), and generate output audio data by subtracting at least a portion of the reference signal(s) from the target signal(s).

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

FIGS. 5A-5C illustrate dynamic and fixed reference beam selection according to embodiments of the present disclosure. As discussed above, Adaptive Reference Algorithm (ARA) processing may generate an adaptive reference signal based on the microphone audio data. To illustrate an example, the ARA processing may perform beamforming using the microphone audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform acoustic echo cancellation by removing (e.g., subtracting) the reference signal from the target signal. As the microphone audio data is not limited to the echo signal, the ARA processing may remove other acoustic noise represented in the microphone audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure.

In some examples, the ARA processing may dynamically select the reference beam based on which beamformed audio data has the largest amplitude and/or highest power. Thus, the ARA processing adaptively selects the reference beam depending on the power associated with each beam. This technique works well during far-end single-talk conditions, as the loudspeaker(s) 114 generating output audio based on the far-end reference signal are louder than other sources of noise and therefore the ARA processing selects the beamformed audio data associated with the loudspeaker(s) 114 as a reference signal.

FIG. 5A illustrates an example of dynamic reference beam selection during far-end single-talk conditions. As illustrated in FIG. 5A, the ARA processing selects the beam associated with a noise source 502 (e.g., the loudspeaker(s) 114) as the reference beam. Thus, even as the noise source 502 moves between beams (e.g., beginning at direction 7 and moving to direction 1), the ARA processing is able to dynamically select beamformed audio data associated with the noise source 502 as the reference signal. The ARA processing may select beamformed audio data associated with the user 501 (e.g., direction 5) as a target signal, performing adaptive noise cancellation to remove the reference signal from the target signal and generate output audio data.

While this technique works well during far-end single-talk conditions, performing dynamic reference beam selection during near-end single-talk conditions and/or double-talk conditions does not provide good results. For example, during near-end single-talk conditions and/or when local speech generated by a user 501 is louder than the loudspeaker(s) 114 during double-talk conditions, the ARA processing selects the beam associated with the user 501 instead of the beam associated with the noise source 502 as the reference beam.

FIG. 5B illustrates an example of dynamic reference beam selection during near-end single-talk conditions. As illustrated in FIG. 5B, the ARA processing initially selects a first beam associated with a noise source 502 (e.g., direction 7 associated with the loudspeaker(s) 114) as the reference beam. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

However, during near-end single-talk conditions the noise source 502 is silent and the ARA processing only detects audio associated with the local speech generated by the user 501 (e.g., the user 501 is talking). As the local speech is the loudest audio, the ARA processing selects a second beam associated with the user 501 (e.g., direction 5 associated with the local speech) as the reference beam. Thus, the ARA processing selects the second beamformed audio data associated with the user 501 (e.g., direction 5) as the reference signal. Whether the ARA processing selects the second beamformed audio data associated with the user 501 (e.g., direction 5) as a target signal, or selects beamformed audio data in a different direction as the target signal, the output audio data generated by performing adaptive noise cancellation does not include the local speech. While FIG. 5B only illustrates near-end single-talk conditions, the example described above also applies during double-talk conditions when the local speech generated by the user 501 is louder than output audio generated by the loudspeaker(s) 114. For example, while the loudspeaker(s) 114 are generating the output audio, the local speech is the loudest audio and the ARA processing selects the second beam associated with the user 501 (e.g., direction 5 associated with the local speech) as the reference beam.

To improve the ARA processing, the device 110 may freeze reference beam selection during near-end single-talk conditions and/or during double-talk conditions. Thus, the ARA processing may dynamically select the reference beam during far-end single-talk conditions, but as soon as local speech is detected (e.g., near-end single-talk conditions and/or double-talk conditions are detected), the ARA processing may store the most-recently selected reference beam and use this reference beam until far-end single-talk conditions resume. For example, during near-end single-talk conditions and/or when local speech generated by a user 501 is louder than the loudspeaker(s) 114 during double-talk conditions, the ARA processing ignores the beam with the most power and continues to use the reference beam previously selected during far-end single-talk conditions, as this reference beam is most likely to be associated with a noise source.

FIG. 5C illustrates an example of freezing reference beam selection during near-end single-talk conditions. As illustrated in FIG. 5C, the ARA processing initially selects a first beam associated with a noise source 502 (e.g., direction 7 associated with the loudspeaker(s) 114) as the reference beam during far-end single-talk conditions. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

When the device 110 detects near-end single-talk conditions, the ARA processing freezes dynamic reference beam selection and stores the first beam associated with the noise source 502 (e.g., direction 7 associated with the loudspeaker(s) 114) as the reference beam until far-end single-talk conditions resume. Thus, during near-end single-talk conditions and/or when local speech generated by the user 501 is louder than the noise source 502 during double-talk conditions, the ARA processing continues to select the first beamformed audio data associated with the noise source 502 (e.g., direction 7) as the reference signal and selects the second beamformed audio data associated with the user 501 (e.g., direction 5) as the target signal, performing adaptive noise cancellation to remove the reference signal from the target signal and generate the output audio data.

While FIG. 5C only illustrates near-end single-talk conditions, the example described above also applies during double-talk conditions. For example, whether the local speech generated by the user 501 is louder than output audio generated by the loudspeaker(s) 114 or the output audio is louder than the local speech, the device 110 may freeze reference beam selection such that the ARA processing selects the first beamformed audio data associated with the noise source 502 (e.g., direction 7) as the reference signal and selects the second beamformed audio data associated with the user 501 (e.g., direction 5) as a target signal, performing adaptive noise cancellation to remove the reference signal from the target signal and generate output audio data.

As described above with regard to FIG. 2, the device 110 may set a number of parameters differently between far-end single-talk conditions and either near-end single-talk conditions or double-talk conditions. As illustrated in FIG. 5C, the device 110 may perform dynamic reference beam selection during far-end single-talk conditions but may freeze reference beam selection during near-end single-talk conditions and double-talk conditions. Similarly, the device 110 may adapt filter coefficients associated with an adaptive noise canceller during far-end single-talk conditions but may freeze filter coefficient adaptation during near-end single-talk conditions and double-talk conditions. For example, in order to remove an echo associated with the far-end reference signal, the device adapts the filter coefficients during far-end single-talk conditions to minimize an "error signal" (e.g., output of the ANC). However, the error signal should not be minimized during near-end single-talk conditions and double-talk conditions as the output of the ANC includes the local speech. Therefore, because continuing to adapt the filter coefficients during near-end single-talk conditions and double-talk conditions would result in the ANC removing portions of the local speech from the output audio data, the device 110 freezes filter coefficient adaptation. Finally, the device 110 may enable residual echo suppression (RES) processing and/or apply aggressive RES processing during far-end single-talk conditions (e.g., to suppress unwanted noise and echo), but disable RES processing and/or apply slight RES processing during near-end single-talk conditions and double-talk conditions (e.g., to improve a quality of the local speech).

FIG. 6 illustrates example components for processing audio data according to embodiments of the present disclosure. As illustrated in FIG. 6, one or more of the microphone(s) 112 may generate near-end reference signal 602 (e.g., microphone audio data) in a time domain, which may be input to sub-band analysis 604 prior to performing audio processing in a frequency domain. For example, the sub-band analysis 604 may include a uniform discrete Fourier transform (DFT) filterbank to convert the near-end reference signal 602 from the time domain into the sub-band domain (e.g., converting to the frequency domain and then separating different frequency ranges into a plurality of individual sub-bands). Therefore, the audio signal X may incorporate audio signals corresponding to multiple different microphones as well as different sub-bands (i.e., frequency ranges) as well as different frame indices (i.e., time ranges). Thus, the audio signal from the mth microphone may be represented as $X_m(k, n)$, where k denotes the sub-band index and n denotes the frame index. The combination of all audio signals for all microphones for a particular sub-band index frame index may be represented as $X(k,n)$.

After being converted to the sub-band domain, the near-end reference signal may be input to a fixed beamformer (FBF) 610, which may perform beamforming on the near-end reference signal. For example, the FBF 610 may apply a variety of audio filters to the output of the sub-band analysis 604, where certain audio data is boosted while other audio data is dampened, to create beamformed audio data corresponding to a particular direction, which may be referred to as a beam. The FBF 610 may generate beamformed audio data using any number of beams without departing from the disclosure.

The beamformed audio data output by the FBF 610 may be sent to External Loudspeaker Position Learning component 612 as well as Acoustic Echo Cancellation (AEC) 120. As discussed above with regard to FIGS. 5A-5C, Adaptive Reference Algorithm (ARA) processing may dynamically select one of the beams output by the FBF 610 as a reference beam with which to perform the AEC. However, in order to avoid selecting the local speech as the reference beam during near-end single-talk conditions and/or double-talk conditions, the device 110 only dynamically selects the reference beam during far-end single-talk conditions, freezing a current reference beam for use upon detecting near-end single-talk conditions and/or double-talk conditions. Thus, the External Loudspeaker Position Learning component 612 may dynamically determine the reference beam during far-end single-talk conditions and then store the current reference beam during near-end single-talk conditions and/or double-talk conditions, using the stored reference beam for AEC until detecting far-end single-talk conditions again.

The AEC component 120 may generate an output by subtracting first beamformed audio data associated with the reference beam from second beamformed audio data associated with a target beam. The AEC component 120 may receive an indication of the reference beam from the External Loudspeaker Position Learning component 612 and may select the target beam using techniques known to one of skill in the art. For example, the AEC component 120 may detect speech represented in the beamformed audio data, may track a direction associated with a user (e.g., identify the direction associated with near-end single-talk conditions), may determine the direction associated with the user using facial recognition, and/or the like.

The output of the AEC component 120 may be input to Residual Echo Suppression (RES) component 122, which may perform residual echo suppression processing to suppress echo signals (or undesired audio) remaining after echo cancellation. In some examples, the RES component 122 may only perform RES processing during far-end single-talk conditions, to ensure that the local speech is not suppressed or distorted during near-end single-talk conditions and/or double-talk conditions. However, the disclosure is not limited thereto and in other examples the RES component 122 may perform aggressive RES processing during far-end single-talk conditions and minor RES processing during near-end single-talk conditions and/or double-talk conditions. Thus, the system conditions may dictate an amount of RES processing applied, without explicitly disabling the RES component 122. Additionally or alternatively, the RES component 122 may apply RES processing to high frequency bands using a first gain value (and/or first attenuation value), regardless of the system conditions, and may switch between applying the first gain value (e.g., greater suppression) to low frequency bands during far-end single-talk conditions and applying a second gain value (and/or second attenuation value) to the low frequency bands during near-end single-talk conditions and/or double-talk conditions. Thus, the system conditions control an amount of gain applied to the low frequency bands, which are commonly associated with speech.

After the RES component 122, the device 110 may apply noise reduction 624, adaptive gain control (AGC) 626, and/or dynamic range compression (DRC) 628 (which may also be referred to as dynamic range control) to generate output audio data in a sub-band domain. The device 110 may apply the noise reduction 624, the AGC 626, and/or the DRC 628 using any techniques known to one of skill in the art. The sub-band synthesis 630 may convert the output audio data from the sub-band domain into an output signal 632 (e.g., output audio data) in the time domain. For example, the output audio data in the sub-band domain may include a plurality of separate sub-bands (e.g., individual frequency bands) and the sub-band synthesis 630 may correspond to a filter bank that combines the plurality of sub-bands to generate the output signal 632 in the time domain.

The device 110 may input far-end reference signal 606 to noise estimation 620, which may estimate an amount of noise based on the far-end reference signal 606. The output of the noise estimation 620 may be used to control the RES component 122 and/or noise reduction 624, as known to one of skill in the art.

As the device 110 sets different parameters depending on whether the device 110 detects far-end single-talk conditions, near-end single-talk conditions, or double-talk conditions, the device 110 may include double-talk detection component 130 to determine the current system conditions. As illustrated in FIG. 6, the device 110 may input the near-end reference signal 602 and the far-end reference signal 606 (e.g., playback audio data send to the loudspeaker(s) 114) to the double-talk detection component 130. While FIG. 6 illustrates the device 110 sending to the double-talk detection component 130 the near-end reference signal 602 prior to performing sub-band analysis 604, the disclosure is not limited thereto. Instead, the device 110 may send the near-end reference signal 602 in the sub-band domain (e.g., output of the sub-band analysis 604) to the double-talk detection component 130 without departing from the disclosure.

The double-talk detection component 130, described in greater detail below with regard to FIGS. 7A-7B, may compare the near-end reference signal 602 to speaker models to determine whether far-end single-talk conditions, near-end single-talk conditions, or double-talk conditions are present. The double-talk detection component 130 may generate an output that includes an indication of current system conditions, such as an indicator of far-end single-talk conditions, near-end single-talk conditions, or double-talk conditions. As illustrated in FIG. 6, the output of the double-talk detection component 130 is input to the AEC component 120 to control echo cancellation. However, this is intended for ease of illustration and the disclosure is not limited thereto. Instead, as will be illustrated in FIGS. 10A-10B, the output of the double-talk detection component 130 may be input to the External Loudspeaker Position Learning component 612, the RES component 122, and/or other components without departing from the disclosure.

Figure 7A:
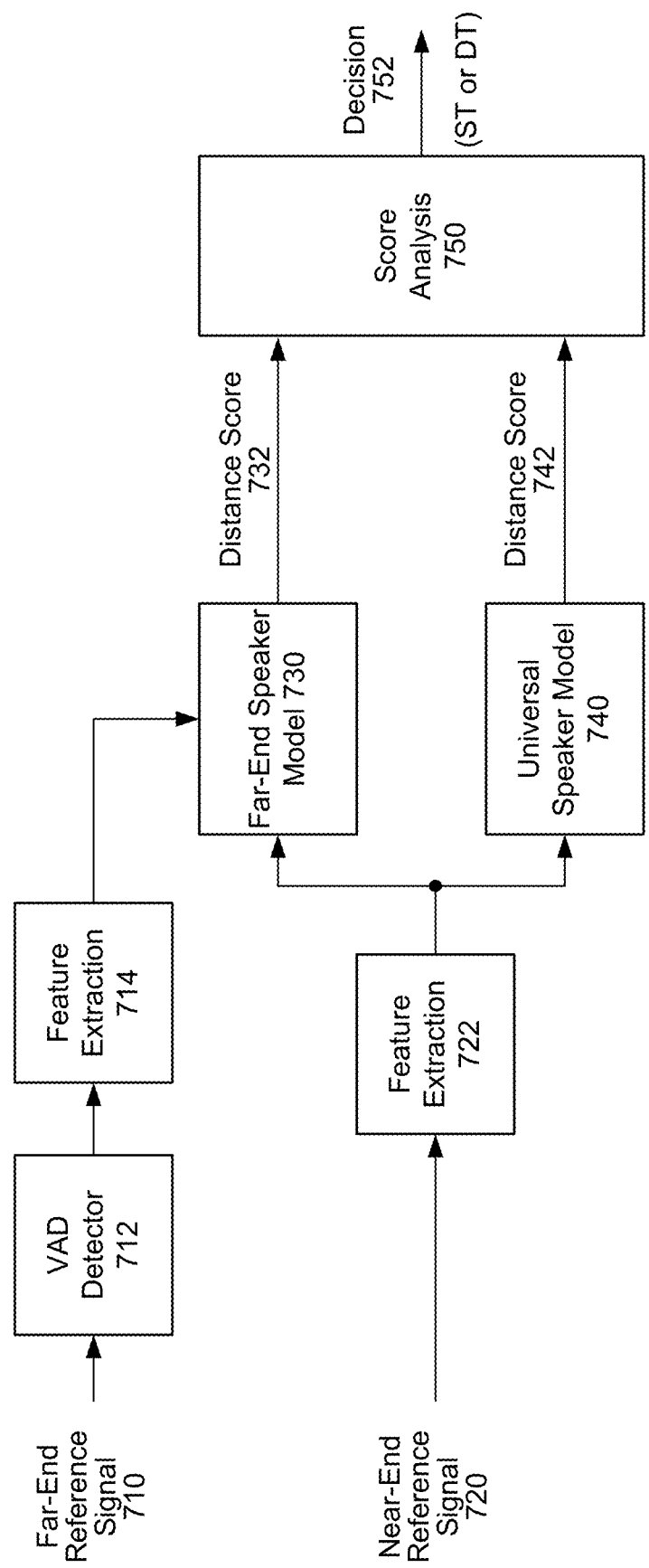

FIGS. 7A-7B illustrate example components for performing double-talk detection using speaker models according to embodiments of the present disclosure. As illustrated in FIGS. 7A-7B, the double-talk detection component 130 may determine whether near-end speech (e.g., local speech) and/or far-end speech (e.g., remote speech) is detected in the near-end reference signal 720 (e.g., microphone audio data) by comparing the near-end reference signal 720 to two or more speaker models (e.g., far-end speaker model 730, universal speaker model 740, and/or near-end speaker model 760). Typically, speaker models are used to perform user recognition, such as determining whether an input utterance was spoken by a particular user. In the context of double-talk detection, however, the device 110 does not utilize speaker models to perform user recognition to specify a specific user. Instead, the double-talk detection component 130 uses speaker models to detect and/or differentiate between far-end speech and/or near-end speech represented in the near-end reference signal 720.

FIG. 7A illustrates a simple example that uses a first speaker model (e.g., far-end speaker model 730) to generate a first distance score 732 indicating a likelihood that the near-end reference signal 720 corresponds to far-end speech and a second speaker model (e.g., universal speaker model 740) to generate a second distance score 742 indicating a likelihood that the near-end reference signal 720 corresponds to "average speech" (e.g., universal speech or generic speech). As the far-end speaker model 730 is trained specifically to detect the far-end speech and the universal speaker model 740 is generic to speech in general, score analysis 750 may distinguish between single-talk conditions and double-talk conditions by comparing the first distance score to the second distance score. For example, the score analysis 750 may determine that far-end single-talk conditions are present when the first distance score is relatively high and the second distance score is relatively low. Alternatively, the score analysis 750 may determine that near-end single-talk conditions are present when the first distance score is relatively low and the second distance score is relatively high. Finally, the score analysis 750 may determine that double-talk conditions are present when both the first distance score and the second distance score satisfy individual condition(s) (e.g., above lower threshold(s), below upper threshold(s), within a desired range, and/or the like).

To compare the near-end reference signal 720 to the far-end speaker model 730 and/or the universal speaker model 740, the device 110 may first perform feature extraction using feature extraction component 722 to transform the near-end reference signal 720 into data for processing by the speech models. For example, the feature extraction component 722 may divide the digitized near-end reference signal 720 into frames representing time intervals for which the feature extraction component 722 determines a number of values, called features, representing the qualities of the near-end reference signal 720, along with a set of those values, called a feature vector or audio feature vector, representing the features/qualities of the near-end reference signal 720 within the frame. Many different features may be determined, as known in the art, and each feature represents some quality of the near-end reference signal 720 that may be useful for processing. A number of approaches may be used by the feature extraction component 722 to process the near-end reference signal 720, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

To illustrate a simple example, the feature extraction component 722 may determine a first energy level value for all frequency bands of the near-end reference signal 720 (e.g., full-band energy level value), may determine a second energy level value for a first frequency band (e.g., 300 Hz to 3 kHz) of the near-end reference signal 720, may determine a third energy level value for a second frequency band (e.g., 3 kHz to 6 kHz) of the near-end reference signal 720, and so on for a plurality of different frequency bands. While the example above referred to specific frequency bands, the disclosure is not limited thereto and the number of frequency bands and the specific frequencies included within each frequency band may vary without departing from the disclosure. In some examples, the feature extraction component 722 may determine a first energy level ratio between the first frequency band and the full-band (e.g., ratio between the second energy level value and the first energy level value), may determine a second energy level ratio between the second frequency band and the full-band (e.g., ratio between the third energy level value and the first energy level value), and so on.

Additionally or alternatively, the feature extraction component 722 may determine a number of other audio features of the near-end reference signal 720 without departing from the disclosure, although the disclosure is not limited thereto. To illustrate first examples of potential audio features, in some examples the feature extraction component 722 may determine an upper envelope value of the near-end reference signal 720 (e.g., upper audio energy envelope value), may determine a lower envelope value (e.g., floor) of the near-end reference signal 720 (e.g., lower audio energy envelope value), and may determine an envelope ratio value (e.g., ratio between the upper envelope value and the lower envelope value). For example, the upper envelope value corresponds to maximum values of the near-end reference signal 720 (e.g., smooth curve outlining upper extremes of the near-end reference signal 720), the lower envelope value corresponds to minimum values of the near-end reference signal 720 (e.g., smooth curve outlining lower extremes of the near-end reference signal 720), and the envelope ratio value indicates an estimate of an amplitude of the near-end reference signal 720. To illustrate a second example of potential audio features, in some examples the feature extraction component 722 may estimate a zero-crossing rate (ZCR) value for the near-end reference signal 720 (e.g., rate of sign-changes along the near-end reference signal 720, such as the rate at which the near-end reference signal 720 includes an energy value change from a positive value to a negative value or from a negative value to a positive value). As discussed above, however, these examples are provided to illustrate example audio features and the disclosure is not limited thereto. Instead, the feature extraction component 722 may simply determine an amount of energy included in each of the frequency bands without departing from the disclosure.

The audio features and/or feature vector generated by the feature extraction component 722 may be input to the far-end speaker model 730 to generate the first distance score 732. For example, the far-end speaker model 730 may generate a first statistic model characterizing speaker characteristics associated with the far-end speech (e.g., based on speech represented in the far-end reference signal 710) and may generate a first vector to represent the far-end speech. In some examples, the first vector may be represented by a mean $\mu_f$, standard deviation $\sigma_f$, and/or variance $\sigma_f^2$ associated with the far-end speech (with subscript f indicating far-end speech), although the disclosure is not limited thereto. The double-talk detection component 130 (e.g., the far-end speaker model 730 or some other component within the double-talk detection component 130 that is not illustrated in FIG. 7A) may compare the feature vector to the first vector in order to generate the first distance score 732, which indicates how similar the feature vector is compared to the first vector.

Similarly, the audio features and/or the feature vector generated by the feature extraction component 722 may be input to the universal speaker model 740 to generate the second distance score 742. For example, the universal speaker model 740 may generate a second statistic model characterizing speaker characteristics associated with generic speech (e.g., based on test data including speech from a plurality of users) and may generate a second vector to represent the generic speech. In some examples, the second vector may be represented by a mean $\mu_u$, standard deviation $\sigma_u$, and/or variance $\sigma_u^2$ associated with the generic speech (with subscript u indicating universal speech), although the disclosure is not limited thereto. The double-talk detection component 130 (e.g., the universal speaker model 740 or some other component within the double-talk detection component 130 that is not illustrated in FIG. 7A) may compare the feature vector to the second vector in order to generate the second distance score 742, which indicates how similar the feature vector is compared to the second vector.

The universal speaker model 740 is trained using test data representing speech generated by a plurality of users, with speech from a variety of different users included to generate a general speaker model (e.g., such as a universal background model (UBM)). In contrast, while the far-end speaker model 730 is initialized based on the universal speaker model 740 (e.g., the far-end speaker model 730 is initialized using the same test data as the UBM), the far-end speaker model 730 is adapted based on far-end speech represented in the far-end reference signal 710. Thus, the far-end speaker model 730 initially corresponds to the UBM prior to adaptation and then is configured based on the far-end speech to generate a specific speaker model (e.g., such as a Gaussian Mixture Model-Universal Background Model (GMM-UBM)) that detects the far-end speech.

Similarly, in some examples the double-talk detection component 130 includes a third speaker model, illustrated in FIG. 7B as near-end speaker model 760 configured to generate a third distance score 762 indicating a likelihood that the near-end reference signal 720 corresponds to near-end speech. While the near-end speaker model 760 is initialized based on the universal speaker model 740 (e.g., the near-end speaker model 760 is initialized using the same test data as the UBM), the near-end speaker model 760 is adapted based on near-end speech represented in the near-end reference signal 720 during near-end single-talk conditions. Thus, the near-end speaker model 760 initially corresponds to the UBM prior to adaptation and then is configured based on the near-end speech to generate a specific speaker model (e.g., such as a Gaussian Mixture Model-Universal Background Model (GMM-UBM)) that detects the near-end speech.

FIG. 8 illustrates an example of a speaker model according to embodiments of the present disclosure. As illustrated in FIG. 8, a speaker model 802 (e.g., far-end speaker model 730, universal speaker model 740, and/or near-end speaker model 760) may include a scoring component 822, which may receive training data 805, generate a statistic model (e.g., vector) representing characteristics of speech included in the training data 805, and generate a distance score after comparing feature vector data 808 to the statistic model.

The training data 805 stored in the user recognition data storage 804 may be stored as waveforms and/or corresponding features/vectors. The training data 805 may correspond to data from various audio samples. Audio samples included in the training data 805 may be associated with a plurality of users (e.g., for the universal speaker model 740), with first users associated with far-end speech (e.g., for the far-end speaker model 730), and/or with second users associated with near-end speech (e.g., for the near-end speaker model 760). The speaker model 802 may then use the training data 805 to compare against incoming audio data (represented by feature vector data 808) to determine whether the incoming audio data corresponds to the desired speech (e.g., far-end speech for the far-end speaker model 730, universal speech for the universal speaker model 740, and near end-speech for the near-end speaker model 760).

The training data 805 for a particular speaker model may include a feature vector of the same size as a vector of the feature vector data 808. Thus, for example, if a feature vector 808 is of size F, the training data 805 may also be a feature vector of size F. To create such a training data feature vector, during a training period the system may either prompt a user to speak sample audio data or may identify sample audio data known to be associated with a particular source of speech (e.g., near-end speech or far-end speech). The system may then process the sample audio data to create sample training data 805 (e.g., a feature vector of size F). The training data 805 may then be stored by the system (such as in data storage 804) and saved for use during runtime distance score processing.

If the speaker model 802 receives training data 805 as an audio waveform, the speaker model 802 may determine features/vectors of the waveform(s) or otherwise convert the waveform into a data format that can be used by the speaker model 802 to actually perform the distance score calculation. The speaker model 802 may then identify a source of the utterance in the incoming audio data (e.g., near-end speech or far-end speech) by comparing features/vectors of the feature vector data 808 to training features/vectors (either received from the storage 804 or determined from training data 805 received from the storage 804).

The feature vector data 808 may include multiple vectors each corresponding to different portions of the input utterance. Alternatively, the feature vector data 808 may be a single vector representing audio qualities of the input utterance. For example, the single vector may be created using an encoder which can create a fixed-size vector to represent certain characteristics of the audio data entities. In mathematical notation, given a sequence of feature data values x_1, . . . x_n, . . . x_N, with x_n being a D-dimensional vector, an encoder E(x_1, . . . x_N)=y projects the feature sequence to y, with y being a F-dimensional vector. F is a fixed length of the vector and is configurable depending on use of the encoded vector and other system configurations. Accumulated/processed speech audio data for the utterance (from beginpoint to endpoint) may be represented in a single feature vector for the user verification feature vector data 808, which may then be used for distance score calculation.

The speaker model 802 may include a scoring component 822 which determines a distance score indicating whether the input utterance (represented by feature vector data 808) is associated with a particular source of speech (represented by training data 805).

The scoring component 822 may implement one or more trained machine learning models (such neural networks, classifiers, etc.) as known in the art. For example, the scoring component 822 may use Gaussian Mixture Models (GMMs) techniques and/or Gaussian mixture model-universal background model (GMM-UBM) techniques. GMM scoring determines how likely it is that the input user recognition feature vector 808 corresponds to a particular training data feature vector 805 associated with a particular source of speech (e.g., far-end speech, near-end speech, and/or universal speech). The GMM scoring may generate a distance score (e.g., similarity score) for an individual training feature vector and may output the distance score indicating how closely the training data feature vector corresponds to the input feature vector 808 associated with the utterance. The scoring component 822 may also use other techniques such as probabilistic linear discriminant analysis (PLDA) techniques, generative Bayesian models, or the like, to determine similarity scores.

Various machine learning techniques may be used to train and operate models to perform various steps described above, such as user recognition feature extraction, encoding, user recognition scoring, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While FIG. 8 illustrates training data 805 being used to train each speaker model, the device 110 obtains the training data 805 differently for each of the speaker models. For example, the device 110 receives generic test data to train the universal speaker model 740, selects far-end speech represented in the far-end reference signal to train the far-end speaker model 730, and selects speech represented in the near-end reference signal during near-end single-talk conditions to train the near-end speaker model 760.

Figure 9A:
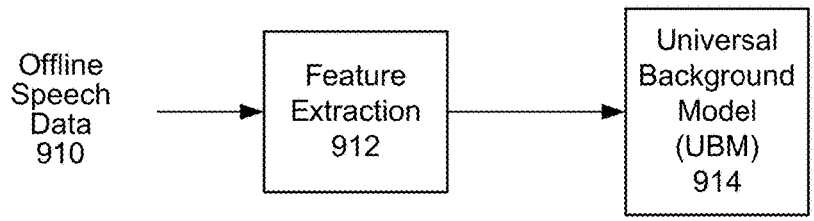
FIGS. 9A-9C illustrate examples of adapting speaker models according to embodiments of the present disclosure.
Figure 9B:
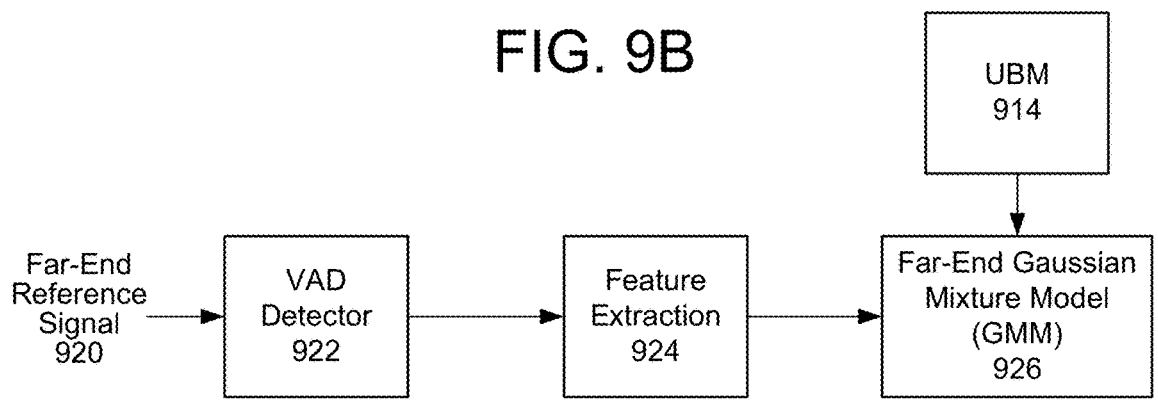
Figure 9C:
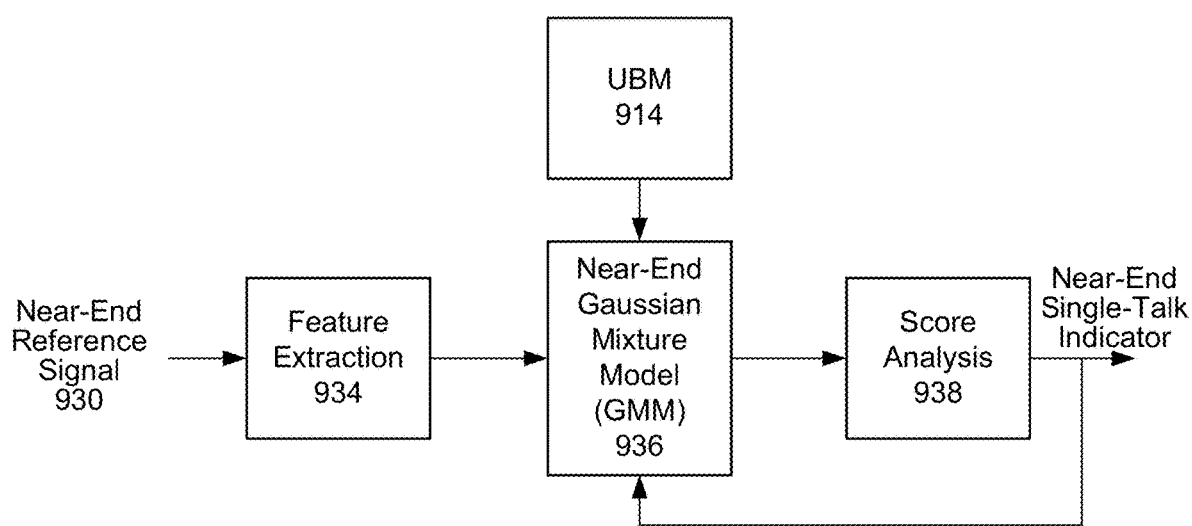

FIGS. 9A-9C illustrate examples of adapting speaker models according to embodiments of the present disclosure. As illustrated in FIG. 9A, the universal speaker model 740 may be trained based on offline speech data 910. For example, the offline speech data 910 is received, feature extraction 912 is performed on the offline speech data 910 to generate first training data, and a universal background model (UBM) 914 is trained based on the first training data. Therefore, the UBM 914 is trained using speech associated with a plurality of users and is not specially adapted to detect specific speech.

In contrast, the far-end speaker model 730 is specifically adapted to detect far-end speech. As illustrated in FIG. 9B, the UBM 914 is input to a far-end Gaussian Mixture Model (GMM) 926 as a baseline model, and the far-end GMM 926 is further adapted based on far-end speech included in far-end reference signal 920. For example, a voice activity detection (VAD) detector 922 may detect speech represented in the far-end reference signal 920, feature extraction 924 may be performed on the far-end reference signal 920 to generate second training data (e.g., only when speech is detected by the VAD detector 922), and the far-end GMM 926 is trained based on the second training data. Therefore, the far-end GMM 926 is trained using speech included in the far-end reference signal 920 and is specially adapted to detect far-end speech.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

To determine the feature vector(s) used as training data for the far-end speaker model 730, the system 100 may (for example using VAD detector 712) determine that voice activity is detected in the far-end reference signal 710. This may indicate the beginning of the utterance, thus resulting in the system 100 determining that the input utterance starts at a first point in audio data. Audio processing may continue on the utterance audio data starting at the first point and continuing until the VAD detector 712 determines that voice activity is not detected at a second point in audio data. Thus, the system 100 may determine that the input utterance ends at the second point. Thus, the first point may be considered the beginpoint of the utterance and the second point may be considered the endpoint of the utterance. The VAD detector 712, or other component, may signal when the beginpoint and/or endpoint is detected so that the audio processing starts at the beginpoint and ends at the endpoint. Further, audio frames during the utterance that do not include speech may be filtered out by the VAD detector 712 and thus not considered by the feature extraction component 714 and/or the far-end speaker model 730. The resulting accumulated/processed speech audio data for the utterance (from beginpoint to endpoint) may then be represented in a single feature vector.

In some examples, the double-talk detection component 130 may include a near-end speaker model 760 illustrated in FIG. 7B that is specially adapted to detect near-end speech. As illustrated in FIG. 9C, the UBM 914 is input to a near-end Gaussian Mixture Model (GMM) 936 as a baseline model, similar to the far-end GMM 926. Thus, the near-end GMM 936 initially detects universal speech and generates a distance score similar to the UBM 914. Near-end reference signal 930 may be received, feature extraction 934 may be performed on the near-end reference signal 930 to generate a feature vector, and the feature vector may be input to the near-end GMM 936 to generate a distance score. The distance score may be output to score analysis 938, which operates similarly to the score analysis 750 to determine whether far-end single-talk conditions, near-end single-talk conditions, or double-talk conditions are present. When the near-end single-talk conditions are present, the score analysis 938 may output a near-end single-talk indicator, which may be sent to the near-end GMM 936. When the near-end GMM 936 receives the near-end single-talk indicator, the near-end GMM 936 may select the feature vector (and any other features input during near-end single-talk conditions) as third training data, and the near-end GMM 936 is trained based on the third training data. Therefore, the near-end GMM 936 is trained using speech included in the near-end reference signal 930 during near-end single-talk conditions and is specially adapted to detect near-end speech.

The near-end GMM 936 may be trained using any technique known to one of skill in the art. To illustrate a specific example, the device 110 may store feature data in a buffer for a period of time, such as feature data corresponding to m frames of audio data. Thus, when first feature data corresponding to a new frame of audio data is input to the near-end GMM 936, the near-end GMM 936 (or other components in the device 110) may add the first feature data to the buffer. When the near-end GMM 936 receives the near-end single-talk indicator (e.g., an indication that near-end single-talk conditions are present), the near-end GMM 936 retrieves the feature data stored in the buffer and adapts based on the contents of the buffer. In some examples, the buffer may be a circular buffer, such that first feature data associated with a newest audio frame replaces second feature data associated with an oldest audio frame stored in the buffer, although the disclosure is not limited thereto.

In some examples, the device 110 may store the speaker models between conversations. For example, the device 110 may adapt the speaker model(s) during a conversation and store the adapted or updated speaker model(s) for future use. The device 110 may store the updated speaker model(s) in local storage on the device 110 and/or in remote storage, such as user profile storage associated with the device 110, a user profile associated with the device, an account associated with the device, and/or the like.

As a first example, the device 110 may adapt the near-end speaker model 760 (e.g., near-end GMM 936) during a first conversation (e.g., first communication session) and store the updated near-end speaker model 760 after the first conversation ends. Upon initiation of a second conversation (e.g., second communication session), the device 110 may retrieve the updated near-end speaker model 760 and continue adapting the near-end speaker model 760 during the second conversation. This is beneficial when a single user profile is associated with the device 110. For example, if the device 110 is used by a first user profile throughout multiple conversations, the device 110 may continually improve the near-end speaker model 760 to detect local speech associated with the first user profile.

As a second example, the device 110 may enable a first conversation (e.g., first communication session) between a first user profile associated with the device 110 and a second user profile associated with a remote device. During the first conversation, the device 110 may adapt the far-end speaker model 730 (e.g., far-end GMM 926) based on the remote speech, and, after the first conversation ends, may associate the far-end speaker model 730 with the second user profile and store the updated far-end speaker model 730. Upon initiation of a second conversation with the second user profile, the device 110 may retrieve the updated far-end speaker model 730 and continue adapting the far-end speaker model 730 during the second conversation. This is beneficial when there are multiple conversations with a single remote user profile (e.g., second user profile), as the device 110 may continue to improve the far-end speaker model 730 to detect remote speech associated with the second user profile.

In some examples, the device 110 may adapt the universal speaker model 740 (e.g., UBM 914) using a combination of local speech and remote speech and may store the updated universal speaker model 740 for future use. For example, FIG. 9A illustrates an example of the UBM 914 being adapted using offline speech data 910. Typically, the offline speech data 910 corresponds to first test data representing speech from a plurality of users, the first test data received from one or more remote devices. However, the disclosure is not limited thereto, and the offline speech data 910 may correspond to the first test data and/or second test data, which may include a combination of the local speech and the remote speech from one or more previous communication sessions, without departing from the disclosure. Referring back to FIG. 7A, in some examples the double-talk detection component 130 may include two speaker models, the far-end speaker model 730 and the universal speaker model 740. As mentioned above, because the far-end speaker model 730 is trained specifically to detect the far-end speech and the universal speaker model 740 is generic to speech in general, the score analysis 750 may distinguish between single-talk and double-talk conditions by comparing the first distance score 732 to the second distance score 742.

To illustrate some examples, the score analysis 750 may determine that far-end single-talk conditions are present when the first distance score 732 is relatively high and the second distance score 742 is relatively low. For example, the first distance score 732 being high indicates that the feature vector is very similar to the first vector associated with the far-end speaker model 730, whereas the second distance score 742 being low indicates that the feature vector is not similar to the second vector associated with the universal speaker model 740, meaning that only far-end speech is present in the near-end reference signal 720. Alternatively, the score analysis 750 may determine that near-end single-talk conditions are present when the first distance score 732 is relatively low and the second distance score 742 is relatively high. For example, the first distance score 732 being low indicates that the feature vector is not similar to the first vector associated with the far-end speaker model 730, whereas the second distance score 742 being high indicates that the feature vector is very similar to the second vector associated with the universal speaker model 740, meaning that only near-end speech is present in the near-end reference signal 720. Finally, the score analysis 750 may determine that double-talk conditions are present when both the first distance score and the second distance score exceed a threshold (or individual thresholds). For example, the first distance score 732 being above a first threshold value indicates that the feature vector is somewhat similar to the first vector associated with the far-end speaker model 730, and the second distance score 742 being above a second threshold value indicates that the feature vector is also somewhat similar to the second vector associated with the universal speaker model 740, meaning that the near-end reference signal 720 includes both near-end speech and far-end speech.

However, the disclosure is not limited thereto and in other examples, the double-talk detection component 130 may include three speaker models, as illustrated in FIG. 7B. For example, in addition to the far-end speaker model 730 and the universal speaker model 740, FIG. 7B illustrates the double-talk detection component 130 including a near-end speaker model 760 configured to generate a third distance score 762 indicating a likelihood that the near-end reference signal 720 corresponds to near-end speech. Thus, the double-talk detection component 130 may compare a first distance score 732 to the second distance score 742 and/or the third distance score 762 to determine whether near-end speech and/or far-end speech is present in the near-end reference signal 720.

To illustrate some examples, the score analysis 750 may determine that far-end single-talk conditions are present when the first distance score 732 is relatively high and both the second distance score 742 and the third distance score 762 is relatively low. For example, the first distance score 732 being high indicates that the feature vector is very similar to the first vector associated with the far-end speaker model 730, whereas the second distance score 742 and the third distance score 762 being low indicates that the feature vector is not similar to the second vector associated with the universal speaker model 740 or the third vector associated with the near-end speaker model 760, meaning that only far-end speech is present in the near-end reference signal 720. Alternatively, the score analysis 750 may determine that near-end single-talk conditions are present when the first distance score 732 is relatively low and the second distance score 742 and/or the third distance score 762 is relatively high. For example, the first distance score 732 being low indicates that the feature vector is not similar to the first vector associated with the far-end speaker model 730, whereas the second distance score 742 being high indicates that the feature vector is very similar to the second vector associated with the universal speaker model 740 and/or the third distance score 762 being high indicates that the feature vector is very similar to the third vector associated with the near-end speaker model 760, meaning that only near-end speech is present in the near-end reference signal 720. Finally, the score analysis 750 may determine that double-talk conditions are present when the first distance score 732 as well as the second distance score 742 and/or the third distance score 762 exceed a threshold (or individual thresholds). For example, the first distance score 732 being above a first threshold value indicates that the feature vector is somewhat similar to the first vector associated with the far-end speaker model 730, the second distance score 742 being above a second threshold value indicates that the feature vector is also somewhat similar to the second vector associated with the universal speaker model 740, and the third distance score 762 being above a third threshold value indicates that the feature vector is also somewhat similar to the third vector associated with the near-end speaker model 760, meaning that the near-end reference signal 720 includes both near-end speech and far-end speech.

FIGS. 7A-7B illustrate the far-end speaker model 730 being adapted based on far-end speech included in the far-end reference signal 710. For example, as discussed above with regard to FIG. 9B, a voice activity detector (VAD) detector 712 may detect speech included in the far-end reference signal 710 and feature extraction component 714 may generate a feature vector based on the far-end reference signal 710 when the speech is detected. This feature vector may be input as training data to train the far-end speaker model 730 and improve detection of the far-end speech in the near-end reference signal 720.

The VAD detector 712 detects whether voice activity (i.e., speech) is present in the post-FFT waveforms associated with the far-end reference signal 710 (e.g., frequency domain framed audio data). The VAD detector 712 (or other components) may also be configured in a different order, for example the VAD detector 712 may operate on the far-end reference signal 710 in the time domain rather than in the frequency domain without departing from the disclosure. Various different configurations of components are possible.

If there is no speech in the far-end reference signal 710, the device 110 discards the far-end reference signal 710 (i.e., removes the audio data from the processing stream). If, instead, the VAD detector 712 detects speech in the far-end reference signal 710, the device 110 performs double-talk detection on the far-end reference signal 710.

Double-talk detection may include performing frame level feature extraction and/or utterance level feature extraction using the feature extraction component 714 and/or the feature extraction component 722. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., feature vector data 808). The feature extraction may continue until voice activity is no longer detected in the input audio data (e.g., far-end reference signal 710 for the feature extraction component 714 and near-end reference signal 720 for the feature extraction component 722), at which point the device 110 may determine that an endpoint of the speech has been reached processing with respect thereto.

Feature extraction involves determining values (i.e., features) representing qualities of the frequency domain framed audio data, along with quantitating those features into values (i.e., feature vectors or audio feature vectors). For ease of illustration, the features/vectors generated by feature extraction may be referred to as feature vectors. Feature extraction may be tailored for double-talk detection (DTD) processing, such as performing DTD feature extraction to generate DTD feature vector data useful for DTD processing using speaker models, but the disclosure is not limited thereto. Instead, feature extraction may also be tailored for Automatic Speech Recognition (ASR) processing, such as performing ASR feature extraction to generate ASR feature vector data useful for ASR processing. The DTD feature vector data and/or the ASR feature vector data may include the same feature vectors, different feature vectors, and/or may include some overlapping feature vectors. A number of approaches may be used to extract feature vector data from the frequency domain framed audio data, such as MFCCs, PLP techniques, neural network feature vector techniques, linear discriminant analysis, semi-tied covariance matrices, or other approaches known to those skilled in the art.

Typically, the feature vector data may include a different audio feature vector for each audio frame. Thus, for one 25 ms long audio frame, the feature extraction components 714/722 may output a single feature vector. Depending on system configuration, the feature extraction components 714/722 may output multiple feature vectors, for example one such vector for each audio frame. Alternatively, the feature extraction components 714/722 may continue to input the frequency domain framed audio data while the utterance is ongoing (e.g., before the endpoint of the speech is reached in the audio data). While the audio data for the utterance is input, the feature extraction components 714/722 may accumulate or otherwise combine the audio data as it comes in. That is, for a certain frame's worth of audio data that comes in, the feature extraction components 714/722 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the feature extraction components 714/722 may depend on what audio qualities are determined to be important for ultimate user recognition. Thus, the feature extraction components 714/722 may be trained to isolate and process data that is most useful for speaker model processing. The output of the feature extraction components 714/722 may thus include feature vector data that includes values for features useful for double-talk detection using speaker models. The resulting feature vector data may then be used for double-talk detection.

FIG. 7B illustrates the near-end speaker model 760 being adapted based on near-end speech included in the near-end reference signal 720 during near-end single-talk conditions. For example, as discussed above with regard to FIG. 9C, the score analysis 750 may determine that near-end single-talk conditions are present and generate a near-end single-talk indicator, which is sent to the near-end speaker model 760. When the near-end single-talk indicator indicates that near-end single-talk conditions are present, the near-end speaker model 760 may use feature vectors received from the feature extraction component 722 as training data to train the near-end speaker model 760 and improve detection of the near-end speech in the near-end reference signal 720.

Figure 10A:
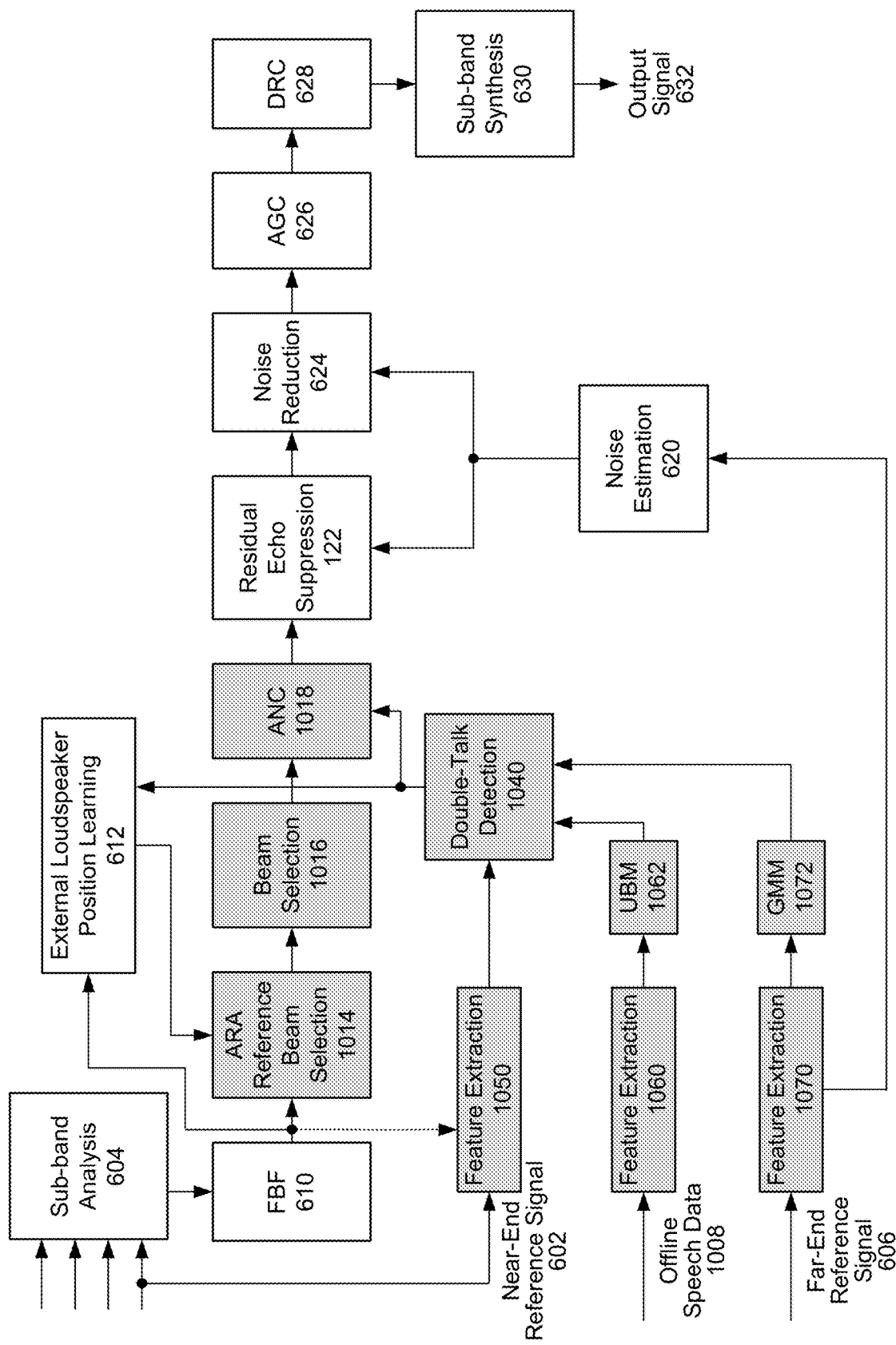
FIGS. 10A-10B illustrate example components for processing audio data using double-talk detection according to embodiments of the present disclosure.
Figure 10B:
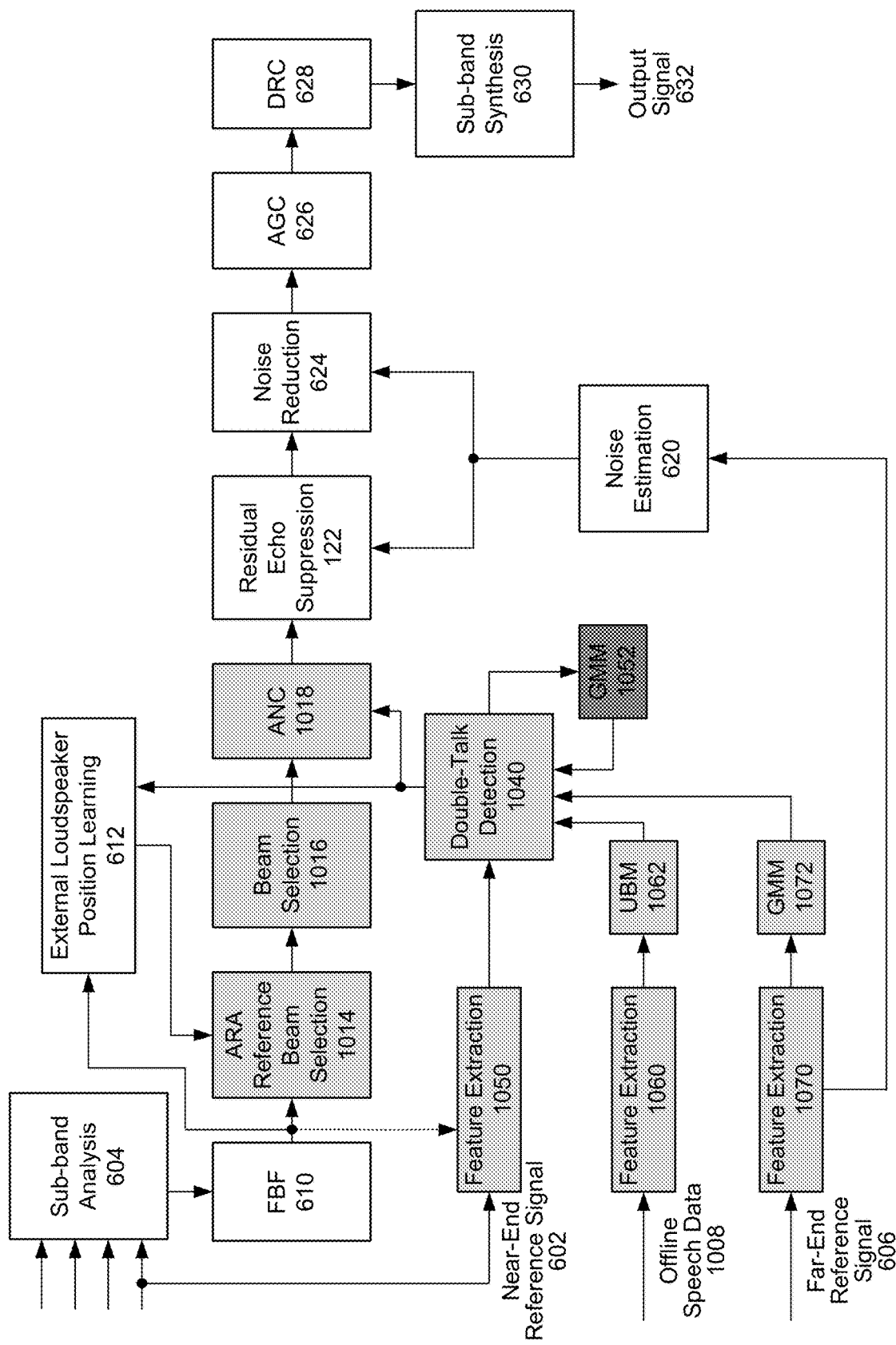

FIGS. 10A-10B illustrate example components for processing audio data using double-talk detection according to embodiments of the present disclosure. As illustrated in FIGS. 10A-10B, the component diagram illustrated in FIG. 6 is modified to include specific components illustrated in FIGS. 7A-9C. Therefore, many of the components illustrated in FIGS. 10A-10B were previously described above with regard to FIG. 6, and a corresponding description may be omitted for ease of explanation.

As illustrated in FIG. 10A, one or more of the microphone(s) 112 may generate near-end reference signal 602 (e.g., microphone audio data) in a time domain, which may be input to sub-band analysis 604 prior to performing audio processing in a frequency domain. For example, the sub-band analysis 604 may include a uniform discrete Fourier transform (DFT) filterbank to convert the near-end reference signal 602 from the time domain into the sub-band domain (e.g., converting to the frequency domain and then separating different frequency ranges into a plurality of individual sub-bands). Therefore, the audio signal X may incorporate audio signals corresponding to multiple different microphones as well as different sub-bands (i.e., frequency ranges) as well as different frame indices (i.e., time ranges). Thus, the audio signal from the mth microphone may be represented as $X_m(k, n)$, where k denotes the sub-band index and n denotes the frame index. The combination of all audio signals for all microphones for a particular sub-band index frame index may be represented as $X(k,n)$.

After being converted to the sub-band domain, the near-end reference signal may be input to a fixed beamformer (FBF) 610, which may perform beamforming on the near-end reference signal. For example, the FBF 610 may apply a variety of audio filters to the output of the sub-band analysis 604, where certain audio data is boosted while other audio data is dampened, to create beamformed audio data corresponding to a particular direction, which may be referred to as a beam. The FBF 610 may generate beamformed audio data using any number of beams without departing from the disclosure.

The beamformed audio data output by the FBF 610 may be sent to External Loudspeaker Position Learning component 612. As discussed above with regard to FIGS. 5A-5C, ARA processing may dynamically select one of the beams output by the FBF 610 as a reference beam with which to perform adaptive noise cancellation. However, in order to avoid selecting the local speech as the reference beam during near-end single-talk conditions and/or double-talk conditions, the device 110 only dynamically selects the reference beam during far-end single-talk conditions, freezing a current reference beam for use upon detecting near-end single-talk conditions and/or double-talk conditions. Thus, the External Loudspeaker Position Learning component 612 may dynamically determine the reference beam during far-end single-talk conditions and then store the current reference beam during near-end single-talk conditions and/or double-talk conditions, using the stored reference beam for AEC until detecting far-end single-talk conditions again.

In addition to the external loudspeaker position learning component 612, the beamformed audio data output by the FBF 610 may be sent to Adaptive Reference Algorithm (ARA) reference beam selection component 1014. In some examples, the ARA reference beam selection 1014 may receive an indication of the reference beam from the external loudspeaker position learning component 612. However, the disclosure is not limited thereto, and in other examples the ARA reference beam selection 1014 may receive an indication of a current position of the loudspeaker from the external loudspeaker position learning component 612 and, based on the current position of the loudspeaker, may select the reference beam. Thus, the external loudspeaker position learning component 612 and/or the ARA reference beam selection 1014 may select the reference beam without departing from the disclosure.

The ARA reference beam selection component 1014 may output the reference beam to beam selection component 1016, which may select a target beam and output both the reference beam and the target beam to an adaptive noise cancellation (ANC) component 1018. For example, the beam selection component 1016 may select the target beam using techniques known to one of skill in the art. For example, the beam selection component 1016 may detect speech represented in the beamformed audio data, may track a direction associated with a user (e.g., identify the direction associated with near-end single-talk conditions), may determine the direction associated with the user using facial recognition, and/or the like.

While FIG. 10A illustrates the ANC component 1018 receiving both the reference beam and the target beam from the beam selection component 1016, the disclosure is not limited thereto and the ANC component 1018 may receive a first indication of the reference beam from the ARA reference beam selection component 1014 and a second indication of the target beam from the beam selection component 1016 without departing from the disclosure.

The ANC component 1018 may perform adaptive noise cancellation based on the reference beam and the target beam. For example, the ANC component 1018 may generate first beamformed audio data based on the reference beam, generate second beamformed audio data based on the target beam, and generate an output by subtracting the first beamformed audio data from the second beamformed audio data.

The output of the ANC component 1018 may be input to Residual Echo Suppression (RES) component 122, which may perform residual echo suppression to suppress echo signals (or undesired audio) remaining after echo cancellation. In some examples, the RES component 122 may only perform echo suppression during far-end single-talk conditions, to ensure that the local speech is not suppressed or distorted during near-end single-talk conditions and/or double-talk conditions. However, the disclosure is not limited thereto and in other examples the RES component 122 may perform aggressive RES processing during far-end single-talk conditions and minor RES processing during near-end single-talk conditions and/or double-talk conditions. Thus, the system conditions may dictate an amount of RES processing applied, without explicitly disabling the RES component 122. Additionally or alternatively, the RES component 122 may apply RES processing to high frequency bands using a first gain value (and/or first attenuation value), regardless of the system conditions, and may switch between applying the first gain value (e.g., greater suppression) to low frequency bands during far-end single-talk conditions and applying a second gain value (and/or second attenuation value) to the low frequency bands during near-end single-talk conditions and/or double-talk conditions. Thus, the system conditions control an amount of gain applied to the low frequency bands, which are commonly associated with speech.

After the RES component 122, the device 110 may apply noise reduction 624, adaptive gain control (AGC) 626, and/or dynamic range compression (DRC) 628 (which may also be referred to as dynamic range control) to generate output audio data in a sub-band domain. The device 110 may apply the noise reduction 624, the AGC 626, and/or the DRC 628 using any techniques known to one of skill in the art. The sub-band synthesis 630 may convert the output audio data from the sub-band domain into an output signal 632 (e.g., output audio data) in the time domain. For example, the output audio data in the sub-band domain may include a plurality of separate sub-bands (e.g., individual frequency bands) and the sub-band synthesis 630 may correspond to a filter bank that combines the plurality of sub-bands to generate the output signal 632 in the time domain.

The device 110 may input far-end reference signal 606 to noise estimation 620, which may estimate an amount of noise based on the far-end reference signal 606. The output of the noise estimation 620 may be used to control the RES component 122 and/or noise reduction 624, as known to one of skill in the art.

As the device 110 sets different parameters depending on whether the device 110 detects far-end single-talk conditions, near-end single-talk conditions, or double-talk conditions, the device 110 may include double-talk detection component 1040 to determine the current system conditions. The double-talk detection component 1040 may determine the current system conditions based on first feature data associated with the near-end reference signal 602 that is received from feature extraction component 1050. For example, the feature extraction component 1050 may receive the near-end reference signal 602 and may perform feature extraction to generate the first feature data.

As illustrated in FIG. 10A, the device 110 may input the near-end reference signal 602 to the feature extraction component 1050. While FIG. 10A illustrates the device 110 sending to the feature extraction component 1050 the near-end reference signal 602 prior to performing sub-band analysis 604, the disclosure is not limited thereto. Instead, the device 110 may send the near-end reference signal 602 in the sub-band domain (e.g., output of the sub-band analysis 604) to the feature extraction component 1050 without departing from the disclosure. Additionally or alternatively, the FBF 610 may output beamformed audio data to the feature extraction component 1050 without departing from the disclosure.

The double-talk detection component 1040 may compare the first feature data to two or more speaker models to determine the current system conditions. As discussed above, FIGS. 7A-7B illustrate the far-end speaker model 730 receiving feature data associated with the near-end reference signal 720 and generating a first distance score 732, while the universal speaker model 740 receives the feature data and generates a second distance score 742. In contrast, FIGS. 10A-10B illustrate an alternative implementation in which the far-end speaker model (e.g., GMM 1072) outputs a first vector to the double-talk detection component 1040 and the universal speaker model (e.g., UBM 1062) outputs a second vector to the double-talk detection component 1040. Thus, the double-talk detection component 1040 may compare the first feature data to the first vector to generate the first distance score indicating a likelihood that the near-end reference signal 602 corresponds to far-end speech, may compare the first feature data to the second vector to generate the second distance score indicating a likelihood that the near-end reference signal 720 corresponds to "average speech" (e.g., universal speech or generic speech), and may determine the current system conditions based on the first distance score and the second distance score, as discussed above with regard to FIG. 7A.

While FIG. 10A illustrates the double-talk detection component 1040 generating the first distance score and the second distance score, the disclosure is not limited thereto. Instead, the GMM 1072 may receive the first feature data from the feature extraction component 1050, may generate the first distance score, and may output the first distance score to the double-talk detection component 1040 without departing from the disclosure. Similarly, the UBM 1062 may receive the first feature data from the feature extraction component 1050, may generate the second distance score, and may output the second distance score to the double-talk detection component 1040 without departing from the disclosure.

As illustrated in FIG. 10A, offline speech data 1008 may be input to feature extraction component 1060 to generate second feature data and the second feature data may be used to train and update the UBM 1062. For example, the device 110 may periodically download the offline speech data 1008 from one or more centralized server(s) to keep the UBM 1062 up to date. Similarly, the far-end reference signal 606 may be input to feature extraction component 1070 to generate third feature data and the third feature data may be used to train and update the GMM 1072. For example, the device 110 may include a VAD detector and may update the GMM 1072 when far-end speech is detected by the VAD detector, as discussed above with regard to FIGS. 7A-7B and 9B.

As illustrated in FIG. 10A, the output of the double-talk detection component 1040 is input to the External Loudspeaker Position Learning component 612 and to the ANC component 1018 to control noise cancellation. In addition, the output of the double-talk detection component 1040 may be input to the RES component 122 and/or other components without departing from the disclosure.

FIG. 10B illustrates an example in which the double-talk detection component 1040 compares the first feature data to a third speaker model (e.g., GMM 1052) that is associated with near-end speech. For example, the near-end speaker model (e.g., GMM 1052) outputs a third vector to the double-talk detection component 1040 and the double-talk detection component 1040 may compare the first feature data to the third vector to generate a third distance score indicating a likelihood that the near-end reference signal 602 corresponds to near-end speech. Based on the first distance score, the second distance score, and/or the third distance score, the double-talk detection component 1040 may determine the current system conditions, as discussed above with regard to FIG. 7B.

However, while FIG. 10B illustrates the double-talk detection component 1040 generating the third distance score, the disclosure is not limited thereto. Instead, the near-end speaker model (e.g., GMM 1052) may receive the first feature data from the feature extraction component 1050, may generate the third distance score, and may output the third distance score to the double-talk detection component 1040 without departing from the disclosure.

Figure 11A:
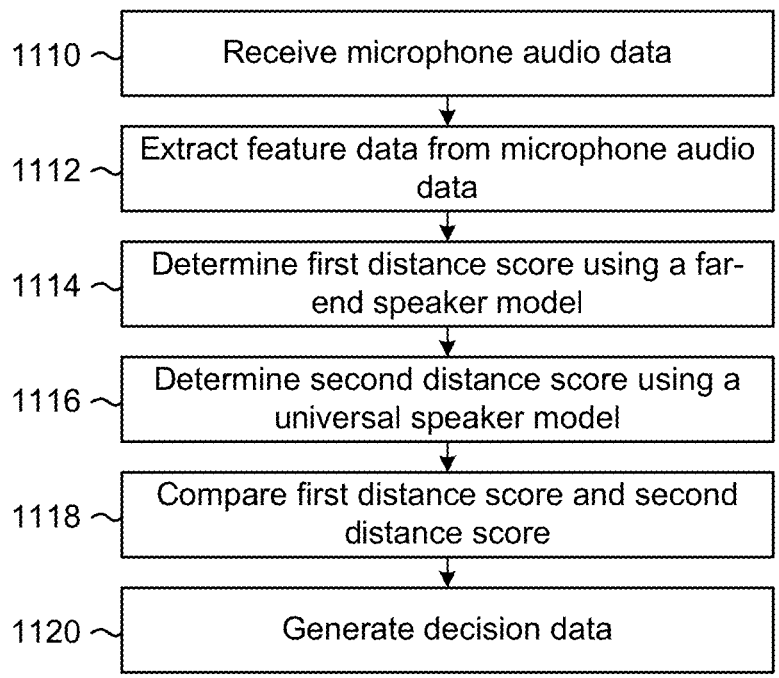
FIGS. 11A-11B are flowcharts conceptually illustrating example methods for performing double-talk detection according to embodiments of the present disclosure.
Figure 11B:
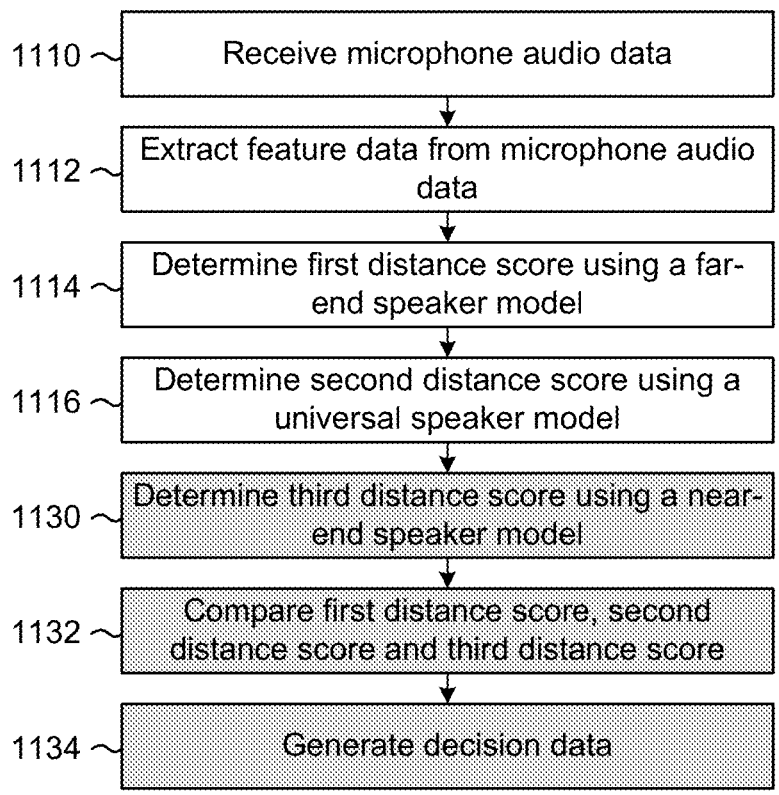

FIGS. 11A-11B are flowcharts conceptually illustrating example methods for performing double-talk detection according to embodiments of the present disclosure. As illustrated in FIG. 11A, the device 110 may receive (1110) microphone audio data and may extract (1112) feature data from the microphone audio data, as described in greater detail above with regard to FIGS. 7A-7B and 9A-9C.

The device 110 may determine (1114) a first distance score using a far-end speaker model and may determine (1116) a second distance score using a universal speaker model. For example, the universal speaker model may correspond to a Universal Background Model (UBM), which is trained using generic speech from a plurality of users, whereas the far-end speaker model may correspond to a Gaussian Mixture Model (GMM) that is trained based on the remote speech. In some examples, the far-end speaker model may corresponds to a Gaussian Mixture Model-Universal Background Model (GMM-UBM), indicating that the far-end speaker model is initially trained using the generic speech from a plurality of users (e.g., same training audio data as the universal speaker model) and then specially adapted to detect the remote speech.

The device 110 may compare (1118) the first distance score to the second distance score and generate (1120) decision data indicating current system conditions. For example, the decision data may indicate that near-end single-talk conditions are present, that far-end single-talk conditions are present, and/or that double-talk detection conditions are present. In some examples, the device 110 may determine that no-speech conditions are present, although the disclosure is not limited thereto and the device 110 may treat no-speech conditions are corresponding to near-end speech conditions without departing from the disclosure.

As discussed in greater detail above, the device 110 may determine that far-end single-talk conditions are present when the first distance score is much larger than the second distance score (e.g., $1^{st} \gg 2^{nd}$), may determine that near-end single-talk conditions are present when the second distance score is much larger than the first distance score (e.g., $1^{st} \ll 2^{nd}$), and may determine that double-talk conditions are present when a difference between the first distance score and the second distance score does not exceed a threshold value (e.g., $1^{st} \approx 2^{nd}$). However, the disclosure is not limited thereto and the device 110 may determine the current system conditions using other techniques without departing from the disclosure.

When the microphone audio data includes the remote speech and not the local speech (e.g., far-end single-talk conditions), the first distance score will be relatively high, indicating a high likelihood that the microphone audio data corresponds to the far-end speaker model (e.g., remote speech is present). When the microphone audio data doesn't include the remote speech (e.g., near-end single-talk conditions and/or no-speech conditions), the first distance score will be relatively low, indicating a low likelihood that the microphone audio data corresponds to the far-end speaker model (e.g., remote speech is not present). Thus, the double-talk detection component 130 may distinguish between near-end single-talk conditions and far-end single-talk conditions based on the first distance score.

Similarly, when the microphone audio data includes the remote speech and not the local speech (e.g., far-end single-talk conditions), the second distance score will be relatively low, indicating a low likelihood that the microphone audio data corresponds to the universal speaker model (e.g., local speech is present). When the microphone audio data includes the local speech and not the remote speech (e.g., near-end single-talk conditions), the second distance score will be relatively high, indicating a high likelihood that the microphone audio data corresponds to the universal speaker model (e.g., local speech is present).

When the microphone audio data includes both the local speech and the remote speech (e.g., double-talk conditions), the first distance score and the second distance score will be above lower threshold(s) and/or below upper threshold(s), indicating a likelihood that the microphone audio data corresponds to both the far-end speaker model (e.g., remote speech is present) and the universal speaker model (e.g., local speech is present). Thus, the double-talk detection component 130 may detect double-talk conditions by comparing the first distance score to first threshold(s) (e.g., above a first lower threshold value and/or below a first upper threshold value) and comparing the second distance score to second threshold(s) (e.g., above a second lower threshold value and/or below a second upper threshold value).

As illustrated in FIG. 11B, the device 110 may include a near-end speaker model directed to detecting the near-end speech (e.g., local speech). Thus, the device 110 may receive (1110) the microphone audio data, may extract (1112) the feature data from the microphone audio data, may determine (1114) the first distance score using a far-end speaker model and may determine (1116) the second distance score using the universal speaker model, as described above with regard to FIG. 11A.

In addition, the device 110 may determine (1130) a third distance score using a near-end speaker model. For example, the near-end speaker model may correspond to a Gaussian Mixture Model (GMM) that is trained based on the near-end speech (e.g., local speech). In some examples, the near-end speaker model may corresponds to a Gaussian Mixture Model-Universal Background Model (GMM-UBM), indicating that the near-end speaker model is initially trained using the generic speech from a plurality of users (e.g., same training audio data as the universal speaker model) and then specially adapted to detect the near-end speech.

The device 110 may compare (1132) the first distance score, the second distance score, and the third distance score and may generate (1134) decision data indicating current system conditions. For example, the device 110 may perform a similar decision as described above with regard to step 1120, except that the third distance score provides the device 110 with additional data to distinguish between near-end single-talk conditions and double-talk conditions.

Figure 12A:
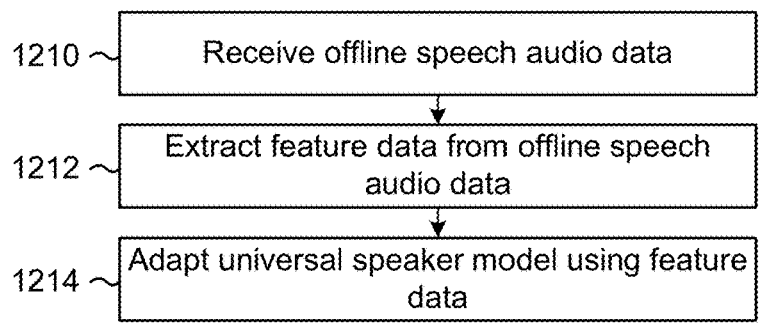
FIGS. 12A-12C are flowcharts conceptually illustrating example methods for adapting speaker models according to embodiments of the present disclosure.
Figure 12B:
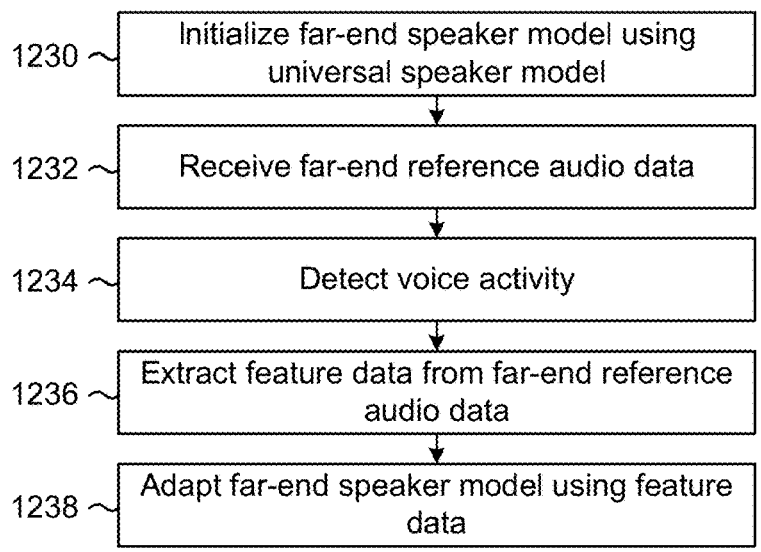
Figure 12C:
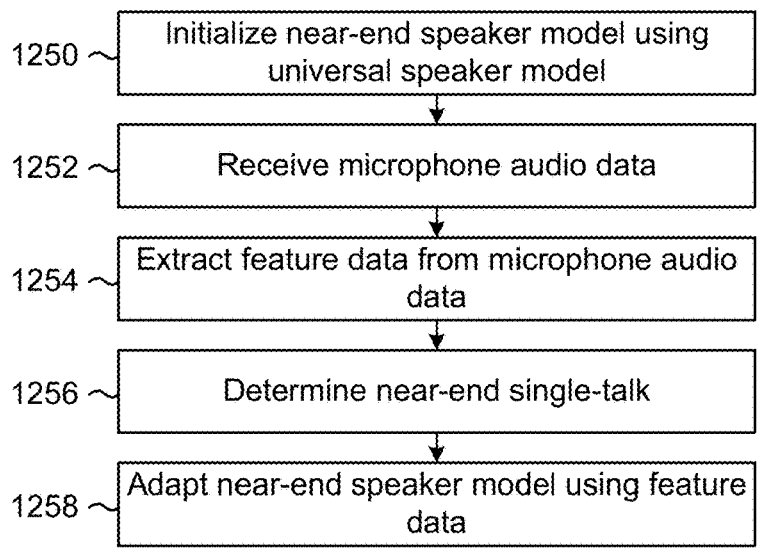

FIGS. 12A-12C are flowcharts conceptually illustrating example methods for adapting speaker models according to embodiments of the present disclosure. FIG. 12A is a first flowchart illustrating an example method for training the universal speaker model, FIG. 12B is a second flowchart illustrating an example method for training the far-end speaker model, and FIG. 12C is a third flowchart illustrating an example method for training the near-end speaker model.

As illustrated in FIG. 12A, the device 110 may receive (1210) offline speech audio data, may extract (1212) feature data from the offline speech audio data, and may adapt (1214) the universal speaker model using the feature data. For example, the device 110 may periodically receive the offline speech audio data and train or update the universal speaker model. However, the disclosure is not limited thereto and the universal speaker model may be initially trained and then not updated. Additionally or alternatively, the device 110 may store a combination of near-end speech and far-end speech as training data and may periodically update the universal speaker model using this training data without departing from the disclosure.

As illustrated in FIG. 12B, the device 110 may initialize (1230) the far-end speaker model using the universal speaker model. For example, the device 110 may train the far-end speaker model using the offline speech audio data, although the disclosure is not limited thereto and the device 110 may transfer statistic model(s), vector(s), and/or the like from the universal speaker model to the far-end speaker model to initialize the far-end speaker model. The device 110 may receive (1232) far-end reference audio data, may detect (1234) voice activity represented in the far-end reference audio data, may extract (1236) feature data from the far-end reference audio data, and may adapt (1238) the far-end speaker model using the feature data.

As illustrated in FIG. 12C, the device 110 may initialize (1250) the near-end speaker model using the universal speaker model. For example, the device 110 may train the near-end speaker model using the offline speech audio data, although the disclosure is not limited thereto and the device 110 may transfer statistic model(s), vector(s), and/or the like from the universal speaker model to the near-end speaker model to initialize the near-end speaker model. The device 110 may receive (1252) microphone audio data (e.g., near-end reference audio data), may extract (1254) feature data from the microphone audio data (e.g., to be used by the double-talk detection component to determine current system conditions), may determine (1256) near-end single-talk conditions are present, and may adapt (1258) the near-end speaker model using the feature data. Thus, the device 110 only updates the near-end speaker model during near-end single-talk conditions. In some examples, the device may optionally detect voice activity represented in the microphone audio data prior to adapting the near-end speaker model, although the disclosure is not limited thereto.

Figure 13A:
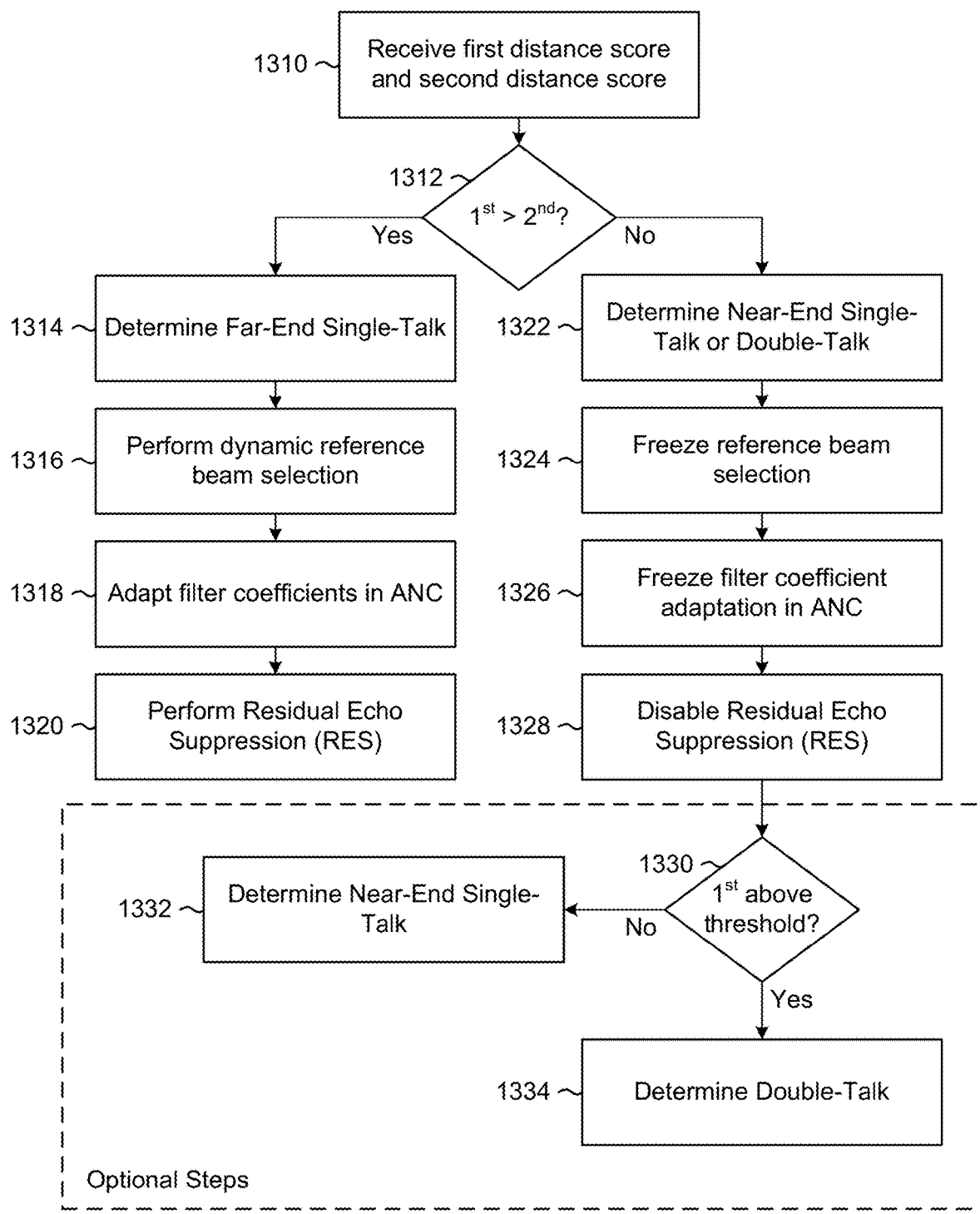
FIGS. 13A-13C are flowcharts conceptually illustrating example methods for performing double-talk detection using two speaker models according to embodiments of the present disclosure.
Figure 13B:
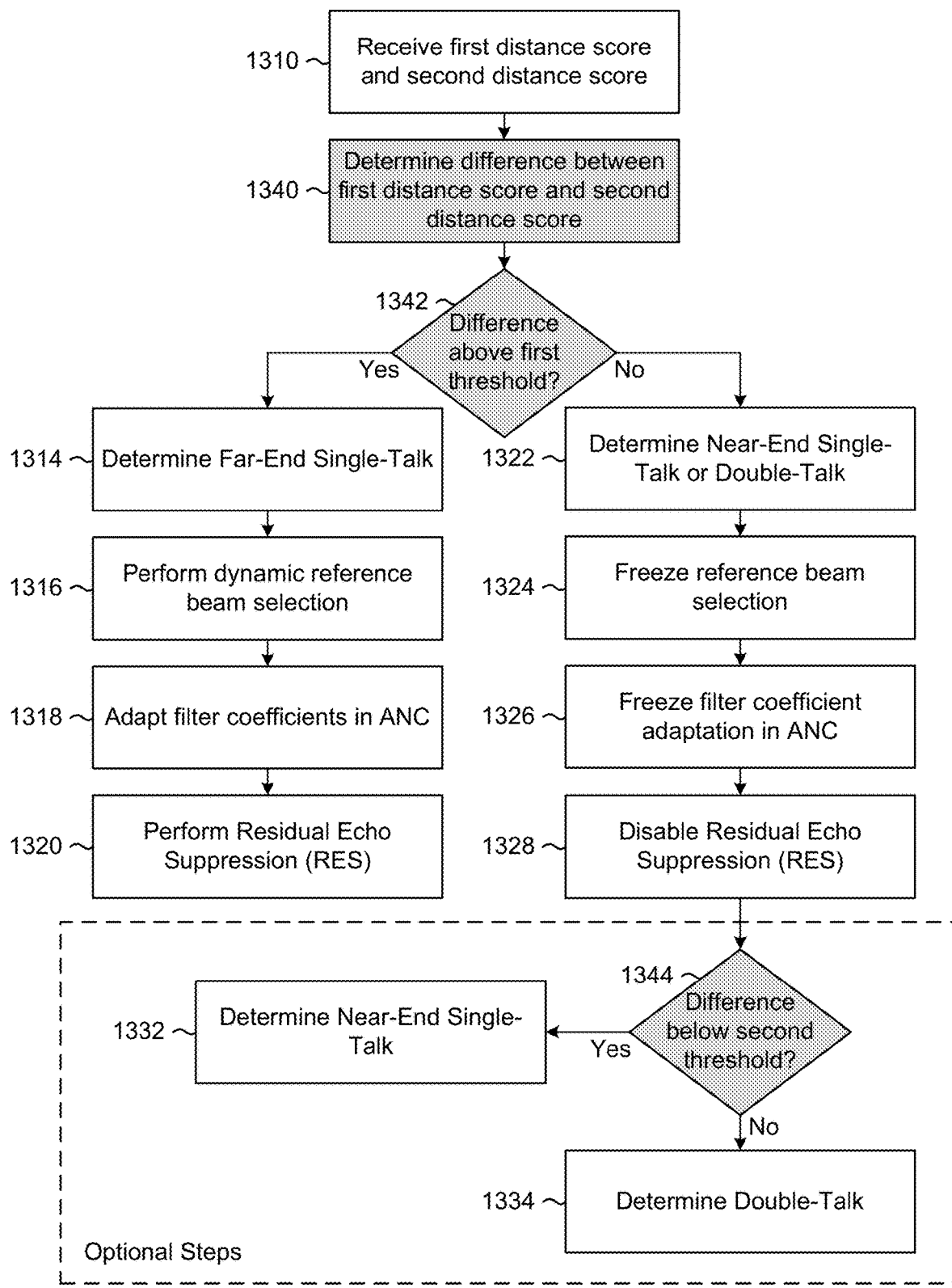
Figure 13C:
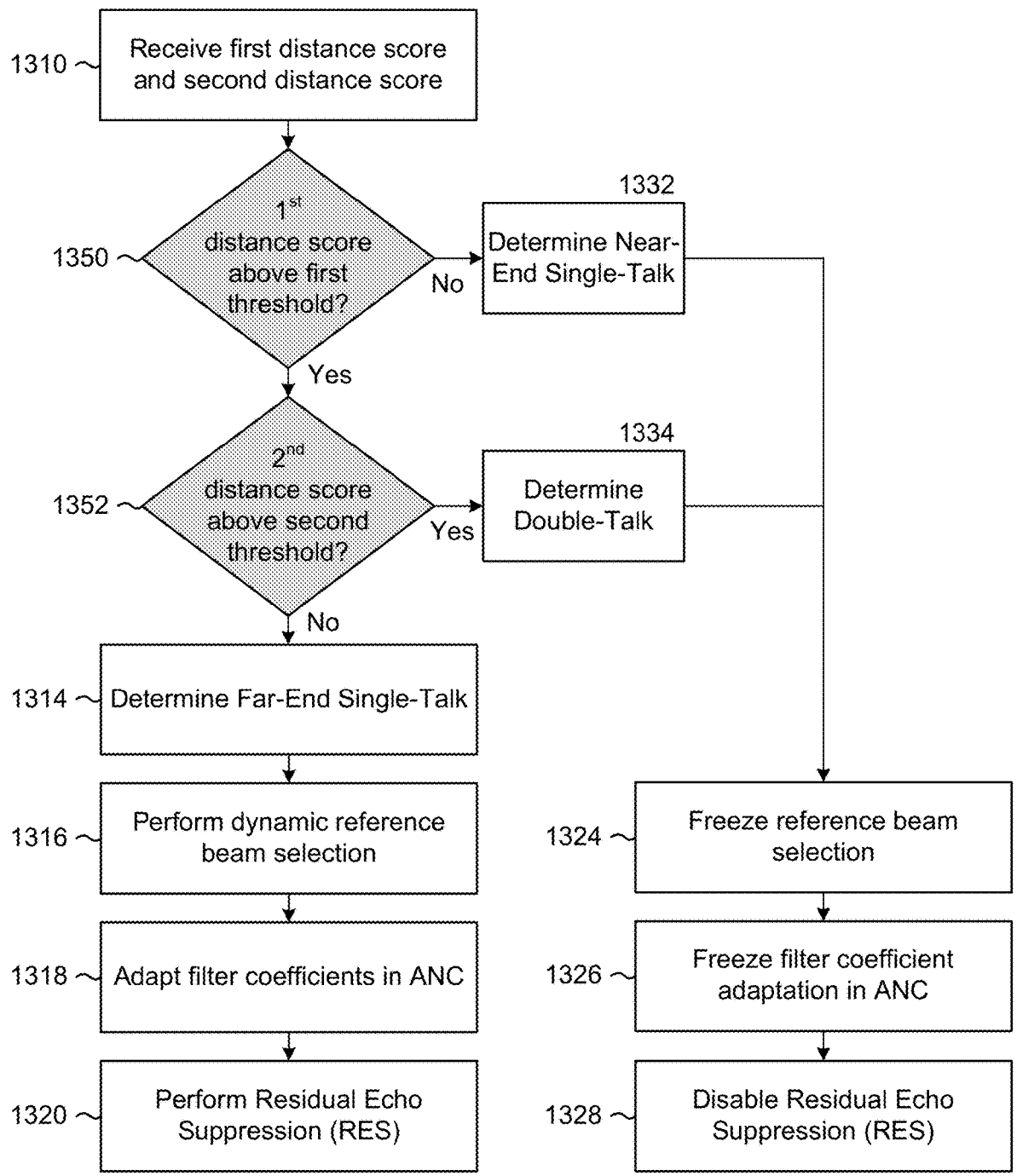

FIGS. 13A-13C are flowcharts conceptually illustrating example methods for performing double-talk detection using two speaker models according to embodiments of the present disclosure.

As illustrated in FIG. 13A, the device 110 may receive (1310) a first distance score and a second distance score and may determine (1312) whether the first distance score is greater than the second distance score.

If the device 110 determines that the first distance score is greater than the second distance score, the device 110 may determine (1314) that far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

If the device 110 determines that the first distance score is not greater than the second distance score, the device 110 may determine (1322) that near-end single-talk conditions or double-talk conditions are present, may freeze (1324) reference beam selection, may freeze (1326) filter coefficient adaptation in the ANC component, and may disable (1328) residual echo suppression.

The device 110 may then optionally determine (1330) whether the first distance score is above a threshold value. If not, the device 110 may determine (1332) that near-end single-talk conditions are present. If the first distance score is above the threshold, the device 110 may determine (1334) that double-talk conditions are present.

As illustrated in FIG. 13B, the device 110 may receive (1310) the first distance score and the second distance score, may determine (1340) a difference between the first distance score and the second distance score, and may determine (1342) whether the difference is above a first threshold value.

If the device 110 determines that the difference is above the first threshold value, the device 110 may determine (1314) far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

If the device 110 determines that the difference is not above the first threshold value, the device 110 may determine (1322) that near-end single-talk conditions or double-talk conditions are present, may freeze (1324) reference beam selection, may freeze (1326) filter coefficient adaptation in the ANC component, and may disable (1328) residual echo suppression.

The device 110 may then optionally determine (1344) whether the difference is below a second threshold value. If it is, the device 110 may determine (1332) that near-end single-talk conditions are present. If the difference is not below the second threshold value, the device 110 may determine (1334) that double-talk conditions are present. For example, the first threshold value may be a positive value (e.g., x) and the second threshold value may be a negative positive value (e.g., -x) having the same magnitude. Thus, the device 110 may determine that far-end single-talk conditions are present when the first distance score is greater than the second distance score by x (e.g., $1^{st} > 2^{nd} + x$), that near-end single talk conditions are present when the first distance score is less than the second distance score by more than x (e.g., $1^{st} + x < 2^{nd}$), and that double-talk conditions are present when the first distance score is within x of the second distance score (e.g., $2^{nd} - x < 1^{st} < 2^{nd} + x$).

As illustrated in FIG. 13C, the device 110 may receive (1310) the first distance score and the second distance score and may determine (1350) whether the first distance score is above a first threshold value. If the first distance score is not above the first threshold value, the device 110 may determine (1332) that near-end single-talk conditions are present.

If the first distance score is above the first threshold value, the device 110 may determine (1352) whether the second distance score is above a second threshold value. If the second distance score is above the second threshold value, the device 110 may determine (1334) that double-talk conditions are present.

If the device 110 determines that near-end single talk conditions and/or double-talk conditions are present, the device 110 may freeze (1324) reference beam selection, may freeze (1326) filter coefficient adaptation in the ANC component, and may disable (1328) residual echo suppression.

If the first distance score is above the first threshold value and the second distance score is not above the second threshold value, the device 110 may determine (1314) that far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

While not illustrated in FIGS. 13A-13C, in some examples the device 110 may apply different settings, parameters, and/or the like based on whether near-end single talk conditions are present or double-talk conditions are present. For example, the device 110 may apply slightly more audio processing, such as stronger residual echo suppression processing, during double-talk conditions than during near-end single-talk conditions, in order to remove a portion of the echo signal.

Figure 14A:
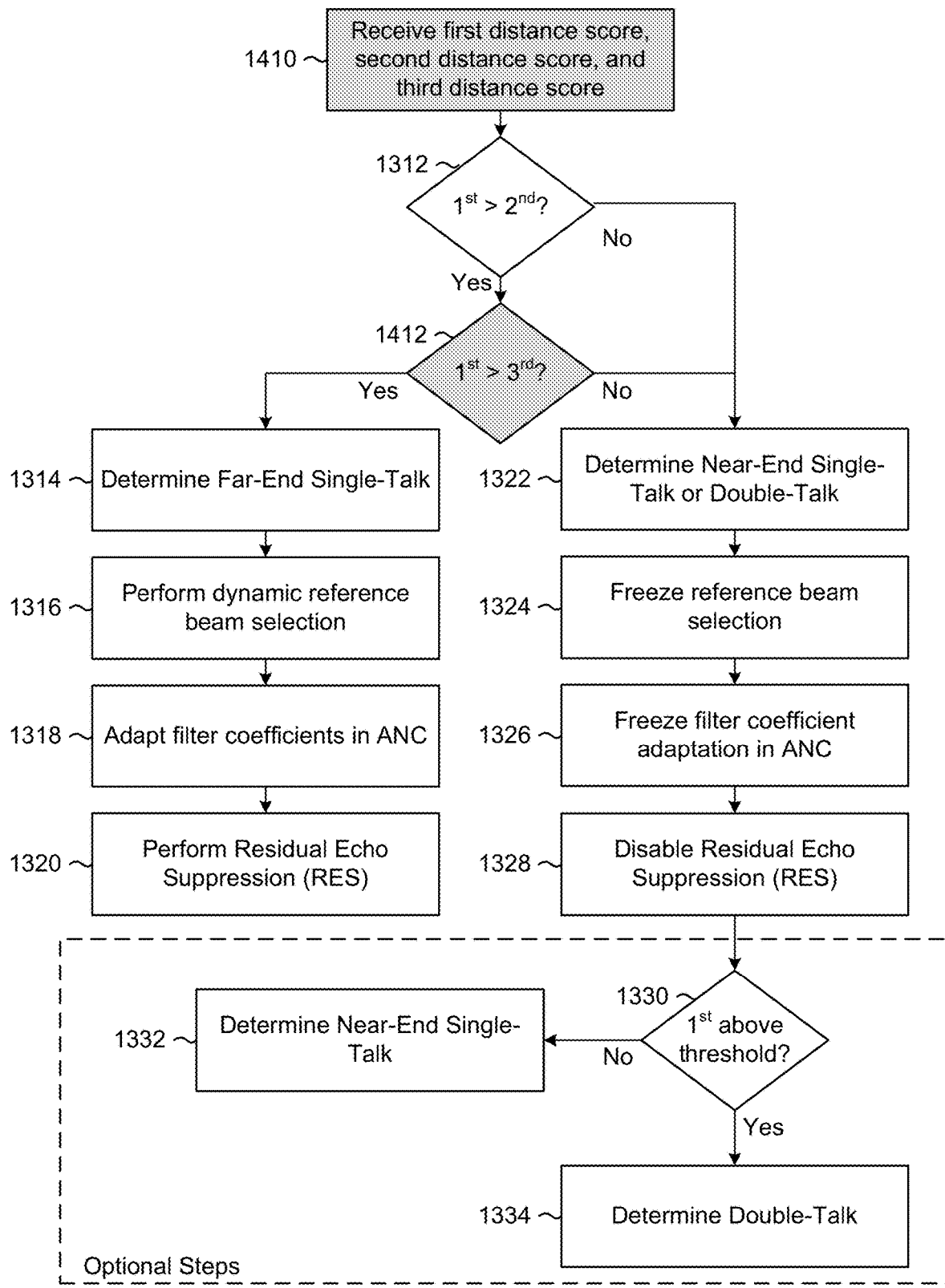
FIGS. 14A-14C are flowcharts conceptually illustrating example methods for performing double-talk detection using three speaker models according to embodiments of the present disclosure.
Figure 14B:
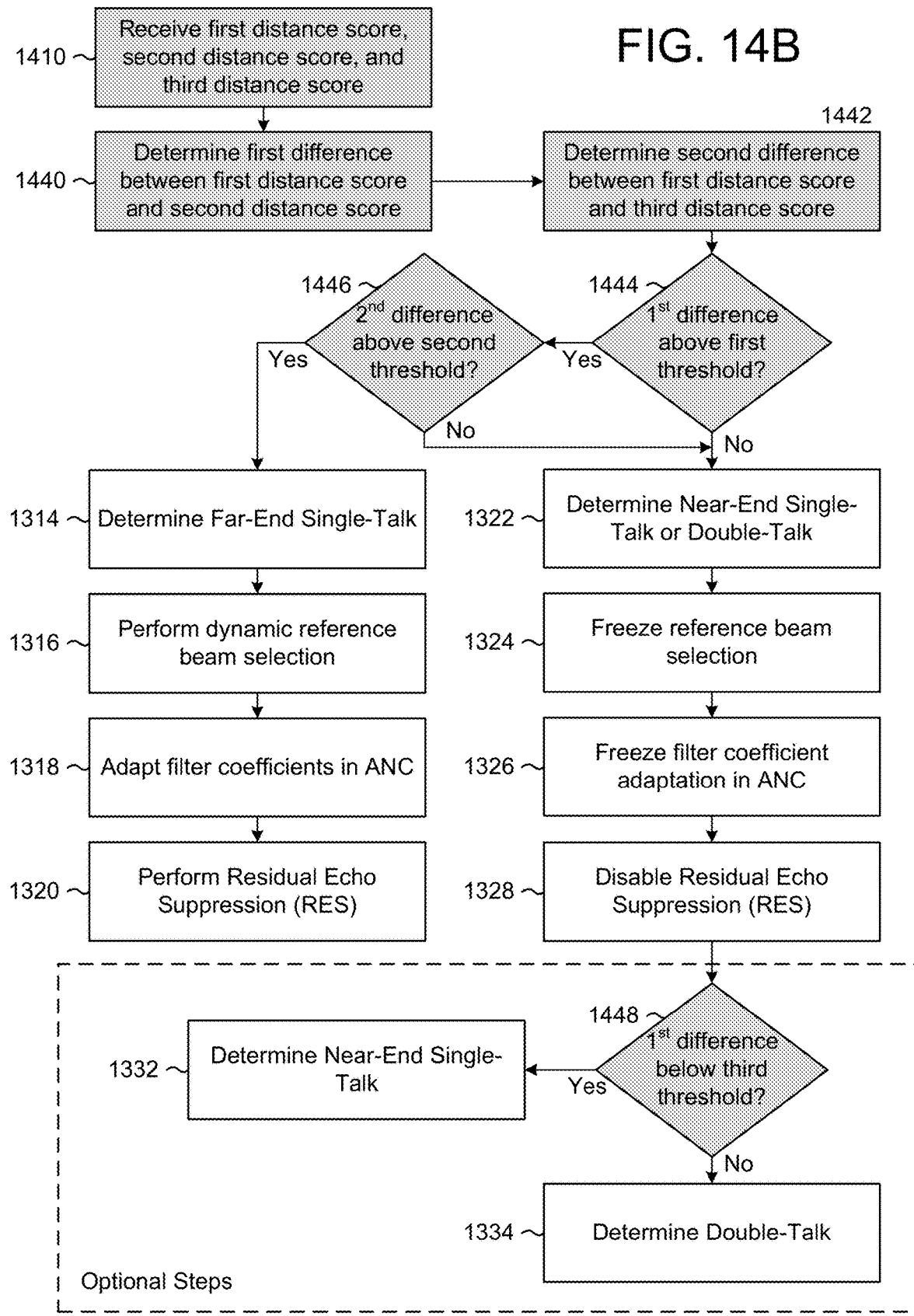
Figure 14C:
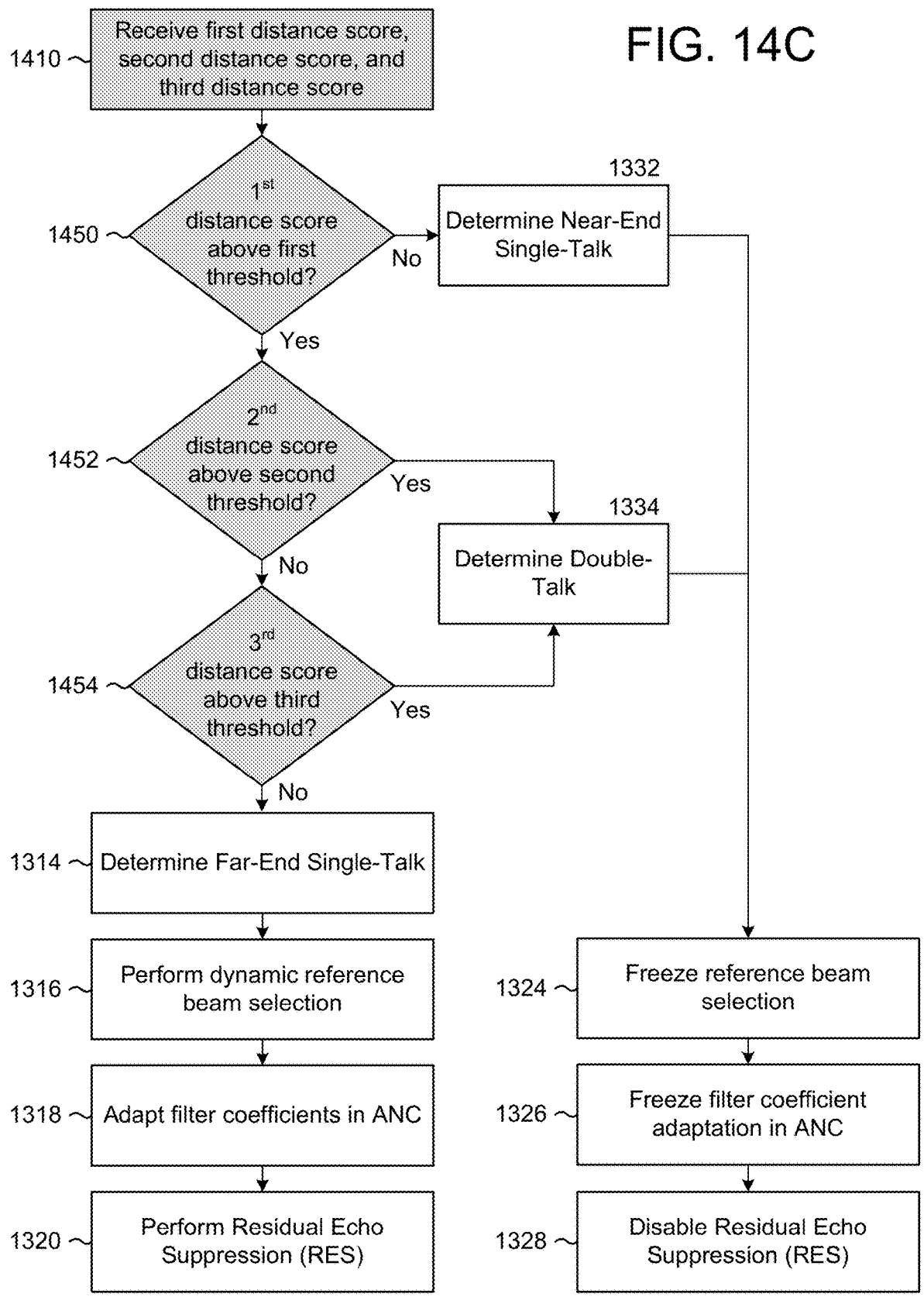

FIGS. 14A-14C are flowcharts conceptually illustrating example methods for performing double-talk detection using three speaker models according to embodiments of the present disclosure.

As illustrated in FIG. 14A, the device 110 may receive (1410) a first distance score, a second distance score, and a third distance score, and may determine (1312) whether the first distance score is greater than the second distance score.

If the device 110 determines that the first distance score is greater than the second distance score in step 1312, the device 110 may determine (1412) whether the first distance score is greater than the third distance score. If the device 110 determines that the first distance score is greater than the third distance score in step 1412, the device 110 may determine (1314) that far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

If the device 110 determines that the first distance score is not greater than the second distance score in step 1312 or that the first distance score is not greater than the third distance score in step 1412, the device 110 may determine (1322) that near-end single-talk conditions or double-talk conditions are present, may freeze (1324) reference beam selection, may freeze (1326) filter coefficient adaptation in the ANC component, and may disable (1328) residual echo suppression.

The device 110 may then optionally determine (1330) whether the first distance score is above a threshold value. If not, the device 110 may determine (1332) that near-end single-talk conditions are present. If the first distance score is above the threshold, the device 110 may determine (1334) that double-talk conditions are present.

As illustrated in FIG. 14B, the device 110 may receive (1410) a first distance score, a second distance score, and a third distance score, may determine (1440) a first difference between the first distance score and the second distance score, may determine (1442) a second difference between the first distance score and the third distance score, may determine (1444) whether the first difference is above a first threshold value, and may determine (1446) whether the second difference is above a second threshold value.

If the device 110 determines that the first difference is above the first threshold value in step 1444 and that the second difference is above the second threshold value in step 1446, the device 110 may determine (1314) that far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

If the device 110 determines that the first difference is not above the first threshold value in step 1444 and/or that the second difference is not above the second threshold value in step 1446, the device 110 may determine (1322) that near-end single-talk conditions or double-talk conditions are present, may freeze (1324) reference beam selection, may freeze (1326) filter coefficient adaptation in the ANC component, and may disable (1328) residual echo suppression.

The device 110 may then optionally determine (1448) whether the first difference is below a third threshold value. If the first difference is below the third threshold value, the device 110 may determine (1332) that near-end single-talk conditions are present. If the first difference is not below the third threshold value, the device 110 may determine (1334) that double-talk conditions are present.

As illustrated in FIG. 14C, the device 110 may receive (1410) a first distance score, a second distance score, and a third distance score, and may determine (1450) whether the first distance score is above a first threshold value. If the first distance score is not above the first threshold value, the device 110 may determine (1332) that near-end single-talk conditions are present.

If the first distance score is above the first threshold value, the device 110 may determine (1452) whether the second distance score is above a second threshold value. If the second distance score is above the second threshold value, the device 110 may determine (1334) that double-talk conditions are present.

If the second distance score is above the third threshold value, the device 110 may determine (1454) whether the third distance score is above a third threshold value. If the third distance score is above the third threshold value, the device 110 may determine (1334) that double-talk conditions are present.

If the device 110 determines that near-end single talk conditions and/or double-talk conditions are present, the device 110 may freeze (1324) reference beam selection, may freeze (1326) filter coefficient adaptation in the ANC component, and may disable (1328) residual echo suppression.

If the first distance score is above the first threshold value but the second distance score is not above the second threshold value and the third distance score is not above the third threshold value, the device 110 may determine (1314) that far-end single-talk conditions are present, may perform (1316) dynamic reference beam selection, may adapt (1318) filter coefficients in the adaptive noise cancellation (ANC) component, and may perform (1320) residual echo suppression (RES), as discussed in greater detail above.

While not illustrated in FIGS. 14A-14C, in some examples the device 110 may apply different settings, parameters, and/or the like based on whether near-end single talk conditions are present or double-talk conditions are present. For example, the device 110 may apply slightly more audio processing, such as stronger residual echo suppression processing, during double-talk conditions than during near-end single-talk conditions, in order to remove a portion of the echo signal.

FIG. 15 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 116. The audio output device may be integrated into a single device or may be separate.

As illustrated in FIG. 15, the device 110 may include an address/data bus 1524 for conveying data among components of the device 110. Each component within the device 110 may also be directly connected to other components in addition to (or instead of) being connected to other components across the bus 1524.

The device 110 may include one or more controllers/processors 1504, which may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 110 may also include a data storage component 1508, for storing data and controller/processor-executable instructions (e.g., instructions to perform operations discussed herein). The data storage component 1508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1502.

The device 110 includes input/output device interfaces 1502. A variety of components may be connected through the input/output device interfaces 1502. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 1502, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 1502 may include A/D converters (not illustrated) and/or D/A converters (not illustrated).

The input/output device interfaces 1502 may also include an interface for an external peripheral device connection such as universal serial bus (USB), FireWire, Thunderbolt, Ethernet port or other connection protocol that may connect to network(s) 199.

The input/output device interfaces 1502 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1508 to be executed by controller(s)/processor(s) 1504 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the open of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    receiving, by a local device from a remote device, playback audio data;
    sending the playback audio data to a loudspeaker of the local device to generate output audio;
    determining microphone audio data using a microphone of the local device, the microphone audio data including a first representation of at least a portion of the output audio;
    processing the microphone audio data using a first model to generate a first score indicating a first likelihood that far-end speech originating from the remote device is represented in a first portion of the microphone audio data, the first model configured to detect the far-end speech;
    processing the microphone audio data using a second model to generate a second score indicating a second likelihood that first speech is represented in the first portion of the microphone audio data, the second model configured to detect the first speech;
    determining that the first score is above a first threshold value, indicating that the far-end speech is represented in the first portion of the microphone audio data;
    determining that the second score is below a second threshold value, indicating that near-end speech originating at the local device is not represented in the first portion of the microphone audio data;
    determining that the first portion of the microphone audio data represents the far-end speech but not the near-end speech; and
    enabling, in response to determining that the first portion of the microphone audio data represents the far-end speech but not the near-end speech, residual echo suppression.

2. The computer-implemented method of claim 1, further comprising:
    processing the microphone audio data using the first model to generate a third score indicating a third likelihood that the far-end speech is represented in a second portion of the microphone audio data;
    determining that the third score is below the first threshold value, indicating that the far-end speech is not represented in the second portion of the microphone audio data;

processing the microphone audio data using a third model to generate a fourth score indicating a fourth likelihood that the near-end speech is represented in the second portion of the microphone audio data;
determining that the fourth score is above a third threshold value, the third threshold indicating that the near-end speech is represented in the second portion of the microphone audio data;
determining that the second portion of the microphone audio data represents the near-end speech but not the far-end speech; and
disabling, in response to determining that the second portion of the microphone audio data represents the near-end speech but not the far-end speech, the residual echo suppression.

3. The computer-implemented method of claim 2, further comprising:
training the third model using the second portion of the microphone audio data, wherein the third model is trained to detect the near-end speech;
detecting the far-end speech in a first portion of the playback audio data; and
training the first model using the first portion of the playback audio data.

4. A computer-implemented method, the method comprising:
receiving first audio data associated with at least one microphone of a first device;
determining, using a first model, a first score indicating a first likelihood that the first audio data corresponds to far-end speech not originating at the first device;
determining, using a second model, a second score indicating a second likelihood that the first audio data corresponds to the second model;
determining that the first score satisfies a first condition, the first condition corresponding to the far-end speech being represented in the first audio data;
determining that the second score satisfies a second condition, the second condition corresponding to near-end speech not being represented in the first audio data, the near-end speech originating at the first device;
determining, based on the first score satisfying the first condition and the second score satisfying the second condition, that only the far-end speech is represented in the first audio data; and
setting, in response to determining that only the far-end speech is represented in the first audio data, at least one first parameter.

5. The computer-implemented method of claim 4, further comprising:
receiving second audio data from a second device;
sending the second audio data to at least one loudspeaker of the first device;
determining that the second audio data includes a representation of the far-end speech, the far-end speech originating from the second device; and
updating the first model based on the representation of the far-end speech.

6. The computer-implemented method of claim 4, wherein the at least one first parameter is associated with at least one of:
enabling dynamic reference beam selection;
performing aggressive noise cancellation;
enabling filter coefficient adaptation for noise cancellation; or
enabling residual echo suppression.

7. The computer-implemented method of claim 4, further comprising:
receiving second audio data associated with the at least one microphone;
determining, using the first model, a third score indicating a third likelihood that the second audio data corresponds to the far-end speech;
determining, using the second model, a fourth score indicating a fourth likelihood that the second audio data corresponds to the second model;
determining, based on the third score and the fourth score, that at least the near-end speech is represented in the second audio data; and
setting, in response to determining that at least the near-end speech is represented in the second audio data, at least one second parameter.

8. The computer-implemented method of claim 7, wherein the at least one second parameter is associated with at least one of:
disabling dynamic reference beam selection;
performing minor noise cancellation;
disabling filter coefficient adaptation for noise cancellation; or
disabling residual echo suppression.

9. The computer-implemented method of claim 4, further comprising:
receiving second audio data associated with the at least one microphone;
determining, using the first model, a third score indicating a third likelihood that the second audio data corresponds to the far-end speech;
determining, using the second model, a fourth score indicating a fourth likelihood that the second audio data corresponds to the second model;
determining, using a third model, a fifth score indicating a fifth likelihood that the second audio data corresponds to the near-end speech;
determining that at least the near-end speech is represented in the second audio data based on the third score, the fourth score, and the fifth score; and
setting, in response to determining that at least the near-end speech is represented in the second audio data, at least one second parameter.

10. The computer-implemented method of claim 4, further comprising:
receiving second audio data associated with the at least one microphone;
determining, using the first model, a third score indicating a third likelihood that the second audio data corresponds to the far-end speech;
determining, using a third model, a fourth score indicating a fourth likelihood that the second audio data corresponds to the near-end speech;
determining that only the near-end speech is represented in the second audio data based on the third score and the fourth score; and
updating the third model using the second audio data, wherein the third model is trained to detect the near-end speech.

11. The computer-implemented method of claim 4, further comprising:
receiving second audio data associated with the at least one microphone;
determining, using the first model, a third score indicating a third likelihood that the second audio data corresponds to the far-end speech;

determining, using the second model, a fourth score indicating a fourth likelihood that the second audio data corresponds to the second model;

determining that the third score satisfies the first condition, indicating that the far-end speech is represented in the second audio data;

determining that the fourth score does not satisfy the second condition, indicating that the near-end speech is represented in the second audio data; and determining that the near-end speech and the far-end speech are both represented in the second audio data.

12. A computer-implemented method, the method comprising:

receiving first audio data associated with at least one microphone of a first device;

determining, using a first model, a first score indicating a first likelihood that the first audio data corresponds to far-end speech not originating at the first device;

determining, using a second model, a second score indicating a second likelihood that the first audio data corresponds to the second model;

determining that the first score satisfies a first condition, the first condition corresponding to the far-end speech being represented in the first audio data;

determining that the second score satisfies a second condition, the second condition corresponding to near-end speech being represented in the first audio data, the near-end speech originating at the first device;

determining, based on the first score satisfying the first condition and the second score satisfying the second condition, that the near-end speech and the far-end speech are both represented in the first audio data; and setting, in response to determining that the near-end speech and the far-end speech are both represented in the first audio data, at least one first parameter.

13. The computer-implemented method of claim 12, further comprising:

receiving second audio data from a second device;

sending the second audio data to at least one loudspeaker of the first device;

determining that the second audio data includes a representation of the far-end speech, the far-end speech originating from the second device; and updating the first model based on the representation of the far-end speech.

14. The computer-implemented method of claim 12, wherein the at least one first parameter is associated with at least one of:

disabling dynamic reference beam selection;
performing gradual noise cancellation;
disabling filter coefficient adaptation for the noise cancellation; or
disabling residual echo suppression.

15. The computer-implemented method of claim 12, further comprising:

receiving second audio data associated with the at least one microphone;

determining, using the first model, a third score indicating a third likelihood that the second audio data corresponds to the far-end speech;

determining, using the second model, a fourth score indicating a fourth likelihood that the second audio data corresponds to the second model;

determining, based on the third score and the fourth score, that only the far-end speech is represented in the second audio data; and setting, in response to determining that only the far-end speech is represented in the second audio data, at least one second parameter.

16. The computer-implemented method of claim 12, further comprising:

determining, using a third model, a third score indicating a third likelihood that the first audio data corresponds to the near-end speech; and determining that the near-end speech and the far-end speech are both represented in the first audio data based on the first score, the second score, and the third score.

17. The computer-implemented method of claim 12, further comprising:

receiving second audio data associated with the at least one microphone;

determining, using the first model, a third score indicating a third likelihood that the second audio data corresponds to the far-end speech;

determining, using a third model, a fourth score indicating a fourth likelihood that the second audio data corresponds to the near-end speech;

determining that only the near-end speech is represented in the second audio data based on the third score and the fourth score; and updating the third model using the second audio data, wherein the third model is trained to detect the near-end speech.

18. The computer-implemented method of claim 12, further comprising:

receiving second audio data associated with the at least one microphone;

determining, using the first model, a third score indicating a third likelihood that the second audio data corresponds to the far-end speech;

determining, using the second model, a fourth score indicating a fourth likelihood that the second audio data corresponds to the second model;

determining that the third score satisfies the first condition, indicating that the far-end speech is represented in the second audio data;

determining that the fourth score does not satisfy the second condition, indicating that the near-end speech is not represented in the second audio data; and determining that only the far-end speech is represented in the second audio data.

19. A computer-implemented method, the method comprising:

receiving first audio data associated with at least one microphone of a first device;

determining, using a first model, a first score indicating a first likelihood that a first portion of the first audio data corresponds to far-end speech not originating at the first device;

determining, using a second model, a second score indicating a second likelihood that the first portion of the first audio data corresponds to the second model;

determining, based on the first score and the second score, that only the far-end speech is represented in the first portion of the first audio data;

setting, in response to determining that only the far-end speech is represented in the first portion of the first audio data, at least one first parameter;

determining, using the first model, a third score indicating a third likelihood that a second portion of the first audio data corresponds to the far-end speech;

determining, using the second model, a fourth score indicating a fourth likelihood that the second portion of the first audio data corresponds to the second model;

determining, based on the third score and the fourth score, that at least near-end speech is represented in the second portion of the first audio data, the near-end speech originating at the first device; and setting, in response to determining that at least the near-end speech is represented in the second portion of the first audio data, at least one second parameter.

* * * * *